(12) United States Patent
Debique et al.

(10) Patent No.: US 7,426,734 B2
(45) Date of Patent: Sep. 16, 2008

(54) FACILITATING PRESENTATION FUNCTIONALITY THROUGH A PROGRAMMING INTERFACE MEDIA NAMESPACE

(75) Inventors: Kirt A. Debique, Seattle, WA (US); Matthew J Bordenet, Sammamish, WA (US); Pranavakumar Punniamoorthy, Redmond, WA (US); Rajesh A Deshpande, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 691 days.

(21) Appl. No.: 10/938,378

(22) Filed: Sep. 10, 2004

(65) Prior Publication Data

US 2005/0091672 A1   Apr. 28, 2005

Related U.S. Application Data

(60) Provisional application No. 60/514,022, filed on Oct. 24, 2003.

(51) Int. Cl.
  *G06F 3/00* (2006.01)
  *G06F 9/46* (2006.01)
(52) U.S. Cl. ...................... 719/310; 718/104
(58) Field of Classification Search ................ 719/328, 719/310; 718/104
  See application file for complete search history.

(56) References Cited

U.S. PATENT DOCUMENTS

| | | | |
|---|---|---|---|
| 5,218,699 A | 6/1993 | Brandle et al. |
| 5,430,876 A | 7/1995 | Schreiber et al. |
| 5,689,700 A | 11/1997 | Miller et al. |
| 5,748,962 A | 5/1998 | Brechtel et al. |
| 5,761,494 A | 6/1998 | Smedley et al. |
| 5,822,580 A | 10/1998 | Leung |
| 5,903,753 A | 5/1999 | Bramnick et al. |
| 5,937,406 A | 8/1999 | Balabine et al. |
| 5,943,424 A | 8/1999 | Berger et al. |
| 5,956,509 A | 9/1999 | Kevner |
| 5,987,517 A | 11/1999 | Firth et al. |
| 6,061,743 A | 5/2000 | Thatcher et al. |
| 6,175,878 B1 | 1/2001 | Seaman et al. |
| 6,209,124 B1 | 3/2001 | Vermeire et al. |
| 6,256,678 B1 | 7/2001 | Traughber et al. |
| 6,275,871 B1 | 8/2001 | Reinfelder et al. |
| 6,282,581 B1 | 8/2001 | Moore et al. |
| 6,298,354 B1 | 10/2001 | Saulpaugh et al. |
| 6,349,343 B1 | 2/2002 | Foody et al. |
| 6,353,830 B1 | 3/2002 | Yee et al. |
| 6,360,230 B1 | 3/2002 | Chan et al. |
| 6,360,266 B1 | 3/2002 | Pettus |
| 6,381,632 B1 | 4/2002 | Lowell |
| 6,418,448 B1 | 7/2002 | Sarkar |

(Continued)

OTHER PUBLICATIONS

U.S. Appl. No. 09/901,555, filed Jul. 10, 2001 entitled "Application Program Interface for Network Software Platform."

(Continued)

*Primary Examiner*—Meng-Ai An
*Assistant Examiner*—Lechi Truong
(74) *Attorney, Agent, or Firm*—Lee & Hayes, PLLC

(57) ABSTRACT

An Application programming interface (API) provides functions for generating applications, documents, media presentations and other content. These functions allow developers to obtain services from an operating system, object model service, or other system or service.

17 Claims, 9 Drawing Sheets

U.S. PATENT DOCUMENTS

| | | | |
|---|---|---|---|
| 6,430,593 | B1 | 8/2002 | Lindsley |
| 6,442,548 | B1 | 8/2002 | Balabine et al. |
| 6,446,253 | B1 | 9/2002 | Mellmer |
| 6,446,256 | B1 | 9/2002 | Hyman et al. |
| 6,473,794 | B1 | 10/2002 | Guheen et al. |
| 6,480,865 | B1 | 11/2002 | Lee et al. |
| 6,487,578 | B2 * | 11/2002 | Ranganathan ............... 718/104 |
| 6,507,856 | B1 | 1/2003 | Chen et al. |
| 6,519,571 | B1 | 2/2003 | Guheen et al. |
| 6,536,037 | B1 | 3/2003 | Guheen et al. |
| 6,598,093 | B1 * | 7/2003 | Schmidt et al. ............. 719/328 |
| 6,615,166 | B1 | 9/2003 | Guheen et al. |
| 6,643,652 | B2 | 11/2003 | Helgeson et al. |
| 6,721,713 | B1 | 4/2004 | Guheen et al. |
| 6,792,605 | B1 | 9/2004 | Roberts et al. |
| 6,968,503 | B1 | 11/2005 | Chang et al. |
| 2002/0073236 | A1 | 6/2002 | Helgeson |
| 2002/0092004 | A1 | 7/2002 | Lee et al. |
| 2002/0099687 | A1 | 7/2002 | Muralidhar et al. |
| 2002/0112078 | A1 | 8/2002 | Yach |
| 2002/0152244 | A1 | 10/2002 | Dean et al. |
| 2002/0169679 | A1 | 11/2002 | Neumayer |
| 2002/0184401 | A1 | 12/2002 | Kadel, Jr. et al. |
| 2003/0028685 | A1 | 2/2003 | Smith et al. |
| 2003/0051236 | A1 | 3/2003 | Pace et al. |
| 2003/0074206 | A1 | 4/2003 | Hoffman et al. |
| 2003/0084120 | A1 | 5/2003 | Egli |
| 2003/0120665 | A1 | 6/2003 | Fox et al. |
| 2003/0149934 | A1 | 8/2003 | Worden |
| 2003/0167277 | A1 | 9/2003 | Hejlsberg et al. |
| 2003/0167355 | A1 | 9/2003 | Smith et al. |
| 2003/0167356 | A1 | 9/2003 | Smith et al. |
| 2003/0172196 | A1 | 9/2003 | Hejlsberg et al. |
| 2003/0177282 | A1 | 9/2003 | Hejlsberg et al. |
| 2004/0083463 | A1 | 4/2004 | Hawley |
| 2004/0117759 | A1 | 6/2004 | Rippert, Jr. |
| 2004/0205694 | A1 | 10/2004 | James et al. |
| 2006/0294500 | A1 | 12/2006 | Chiang |

OTHER PUBLICATIONS

"Java 2 Platform Enterprise Edition Specification" v1.2 Dec. 17, 1999 pp. 2-8 thru 2-11 and 6-2 thru 6-6.

Arulanthu, et al, "The Design and Performance of A Scalable ORB Architecture for CORBA Asynchronous Messaging." Middleware 2000, Springer-Verlag, 2000,pp. 208-228.

Deitel & Deitel "Java(TM) How to Program Book" Prentice Hall Third Edition 1999 (pp. 7-29, 214-226, 698-699, 714-717, 817-838, 876-878, 936-977, 980-998, 1002-1046).

Hanson, "Differences Between J2SE and J2EE", Sep. 8, 2003, SearchTechTarget.com.

http:///www.w3.org/TR/xstl,W3C, Nov. 1999, pp. 1-90.

http://www.w3.org/TR/1998/NOTE-XML-data-0105,W3C, Jan. 1998, pp. 1-34.

http://www.w3.org/TR/1999/REC-xpath-19991115.html,WC3,Nov. 1999, pp. 1-32.

Ben, A comparative Overview of C#, Genamics, Jul. 31, 2000.

Cohn, Web programming with Visual J++, Sams.net, 1997, chapters 5-6, 17-19.

Flynn, Visual J++ Java programming, New Riders Publishing, 1996, pp. 133-143.

Microsoft, Delegates in Visual J++ 6.0, Mar. 11, 1998, pp. 1-6.

Ensel, et al., "Managing Application Service Dependencies with XML and the Resource Description Framework", IEEE, May 2001, pp. 661-674.

Jingyu, et al., "Object-Oriented Representation for XML Data", IEEE, Apr. 2001, pp. 40-49.

Sneed, "Wrapping Legacy COBOL Programs behind an XML-Interface", IEEE, Oct. 2001, pp. 189-197.

Bill Shannon, Java™2 Platform Enterprise Edition Specification, v 1.2, Sun Microsystems, Palo Alto, CA. U.S.A., Dec. 17, 1999, Ch. 2, pp. 1-11; Ch.6, pp. 1-6.

Cheng et al. "XML and DB2" IEEE Data Engineering 2000. Proceedings 16th International Conference on Feb. 29-Mar. 3, 2000 pp. 569-573.

Deitel & Deitel; Java™ How to Program Book, Prentice Hall, Third Edition, 1999 (pp. 7-29,214-226, 698-699, 714-717, 817-838, 876-878, 936-977, 980-998, 1002-1046).

Flanagan; "Java in a Nutshell" O'Reilly & Associates, 1996, pp. 193-200, 237-253, 267-270, 339-342.

Flanagan; "Java Foundation Classes in a Nutshell" O'Reilly 9-1000. Chapters 1-2.

Gould; "Develop n-tier Applications Using J2EE" Java World Dec. 2000. pp. 1-10.

H. Carr et al., "Compiling Distributed C++" IEEE, 1993, pp. 496-503.

Java™2 Platform, Standard Edition, v 1.2.2 API Specification, 1993-1999 Sun Microsystems, Inc. pp. 1-4 http://java.sun.com/products/jdk/1.2/docs/api/overview-summary.html Retrieved from the Internet on Apr. 4, 2003.

Lam et al., ".NET Framework Essentials" Jun. 2001 O'Reilly pp. 1-32.

Meyer [Microsoft; NET is Coming, Microsoft Web Services Platform] IEEE Computer vol. 34, Issue: 8, Aug. 2001 pp. 92-97.

O'Reilly; "The Network Really is the Computer" Jun. 8, 2000 pp. 1-11. The O'Reilly Network, http://www.oreillynet.com Retrieved from the Internet on Apr. 7, 2003.

The Java™ 2 Enterprise Edition Developer's Guide, v 1.2.1, May 2000, Sun Microsystems, Palo Alto, CA USA; Ch. 1, pp. 1-10 and Ch. 9, pp. 152-155.

"Java 2 Platform, Standard Edition", retrieved on Apr. 4, 2003 at <<http://java.sun.com/products/jdk/1.2/docs/api/overview-summary.html>>, Sun Microsystems, v.1.2.2., 1993-1999, p. 1-4.

Farley, "Microsoft .Net vs. J2EE: How Do They Stack Up?", retrieved on Apr. 27, 2007, at <.oreillynet.com/1pt/a/1799>>, O'Reilly Media, Inc., 2007, pp. 6.

Perry, "Sams Teach Yourself Visual Basic 6 in 21 Days", Sams, 1998, pp. 23.

Wille, "Presenting C#", Sams Publishing, 2000, pp. 22.

Williams, "Teach Yoursefl Visual C ++ 6 in 24 Hours", Sams Publishing, 1998, pp. 54.

* cited by examiner

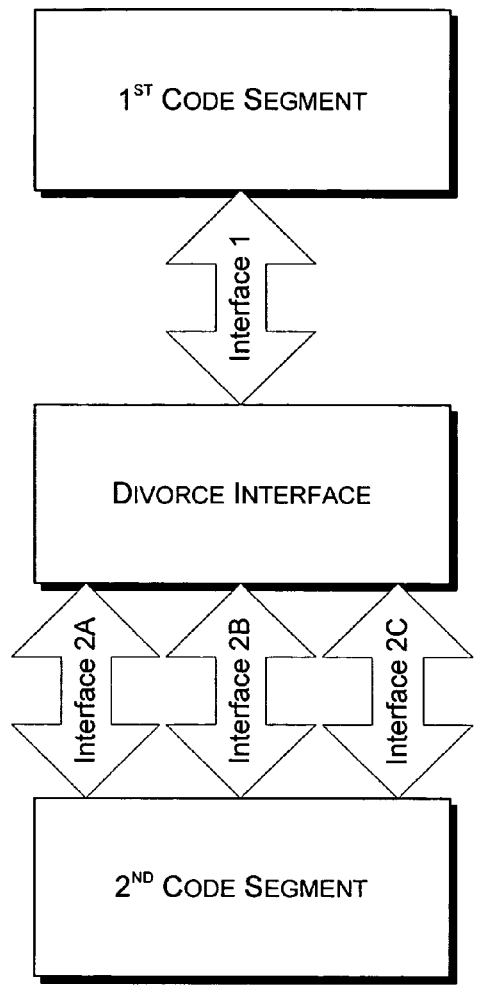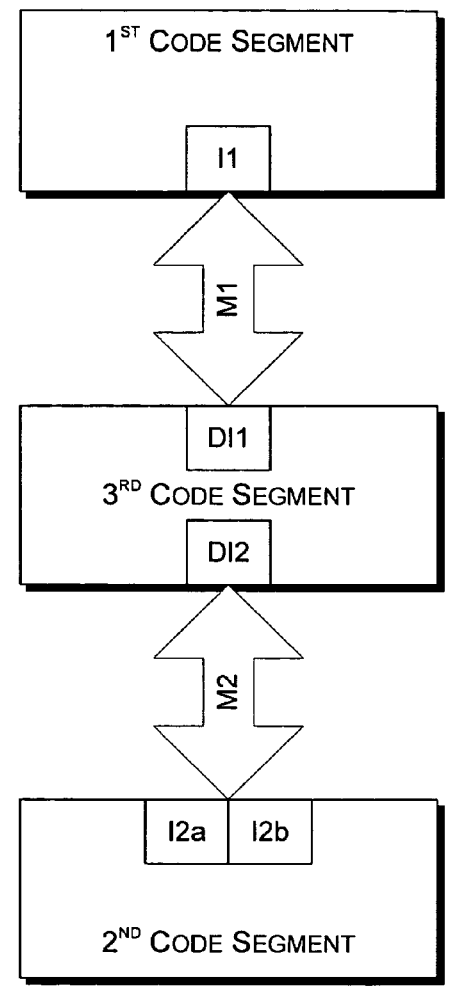
Fig. 13
Fig. 14

FACILITATING PRESENTATION FUNCTIONALITY THROUGH A PROGRAMMING INTERFACE MEDIA NAMESPACE

RELATED APPLICATIONS

This application claims priority to U.S. Provisional Patent Application Ser. No. 60/514,022, filed Oct. 24, 2003, titled "A Programming Interface For A Computing Platform", and is related to the following patents, all of which are incorporated herein by reference:

- U.S. Pat. No. 7,017,162, entitled "Application Program Interface for Network Software Platform", which issued Mar. 21, 2006 from application Ser. No. 09/902,811, filed Jul. 10, 2001.
- U.S. Pat. No. 7,117,504, entitled "Application Program Interface for Network Software Platform", which issued Oct. 3, 2006 from application Ser. No. 09/902,809, filed Jul. 10, 2001.
- U.S. Pat. No. 6,920,461, entitled "Application Program Interface for Network Software Platform", which issued Jul. 19, 2005 from application Ser. No. 09/902,560, filed Jul. 10, 2001.
- U.S. Pat. No. 7,165,239, entitled "Application Program Interface for Network Software Platform", which issued Jan. 16, 2007 from application Ser. No. 09/902,810, filed Jul. 10, 2001.
- U.S. patent application entitled "Application Program Interface for Network Software Platform", application Ser. No. 09/902,812, filed Jul. 10, 2001.
- U.S. Pat. application entitled "Application Program Interface for Network Software Platform", application Ser. No. 09/901,555, filed Jul. 10, 2001.
- U.S. Pat. application entitled "Application Program Interface for Network Software Platform", application Ser. No. 10/087,027, filed Feb. 28, 2002.

TECHNICAL FIELD

The present disclosure generally relates to software and software development, and more particularly to a programming interface that facilitates use of a software platform by application programs and computer hardware.

BACKGROUND

Very early on, computer software came to be categorized as "operating system" software or "application" software. Broadly speaking, an application is software that is meant to perform a specific task for the computer user such as solving a mathematical equation or supporting word processing. The operating system is the software that manages and controls the computer hardware. The goal of the operating system is to make the computer resources available to the application programmer while at the same time, hiding the complexity necessary to actually control the hardware.

The operating system makes the resources available via functions that are collectively known as the Application Program Interface or API. The term API is also used in reference to a single one of these functions. The functions are often grouped in terms of what resource or service they provide to the application programmer. Application software requests resources by calling individual API functions. API functions also serve as the means by which messages and information provided by the operating system are relayed back to the application software.

In addition to changes in hardware, another factor driving the evolution of operating system software has been the desire to simplify and speed application software development. Application software development can be a daunting task, sometimes requiring years of developer time to create and sophisticated program with millions of lines of code. For a popular operating system such as various version of the Microsoft Windows® operating system, application software developers write thousands of different applications each year that utilize the operating system. A coherent and usable operating system base is required to support so many diverse application developers.

Often, development of application software can be made simpler by making the operating system more complex. That is, if a function may be useful to several different application programs, it may be better to write it once for inclusion in the operating system, than requiring dozens of software developers to write it dozens of times for inclusion in dozens of different applications. In this manner, if the operating system supports a wide range of common functionality required by a number of applications, significant savings in applications software development costs and time can be achieved.

Regardless of where the line between operating system and application software is drawn, it is clear that for a useful operating system, the API between the operating system and the computer hardware and application software is as important as efficient internal operation of the operating system itself.

Over the past few years, the universal adoption of the Internet, and networking technology in general, has changed the landscape for computer software developers. Traditionally, software developers focused on single-site software applications for standalone desktop computers, or LAN-based computers that were connected to a limited number of other computers via a local area network (LAN). Such software applications were typically referred to as "shrink wrapped" products because the software was marketed and sold in a shrink-wrapped package. The applications utilized well-defined APIs to access the underlying operating system of the computer.

As the Internet evolved and gained widespread acceptance, the industry began to recognize the power of hosting applications at various sites on the World Wide Web (or simply the "Web"). In the networked world, clients from anywhere could submit requests to server-based applications hosted at diverse locations and receive responses back in fraction of a second. These Web applications, however, were typically developed using the same operating system platform that was originally developed for standalone computing machines or locally networked computers. Unfortunately, in some instance, these applications do not adequately transfer to the distributed computing regime. The underlying platform was simply not constructed with the idea of supporting limitless numbers of interconnected computers.

To accommodate the shift to the distributed computing environment being ushered in by the Internet, Microsoft Corporation developed a network software platform known as the ".NET" Framework (read as "Dot Net"). Microsoft® .NET is software for connecting people, information, systems, and devices. The platform allows developers to create Web services that will execute over the Internet. This dynamic shift was accompanied by a set of API functions for Microsoft's .NET™ Framework.

As use of the .NET™ Framework has become increasingly common, ways to increase the efficiency and/or performance of the platform have been identified. The inventors have developed a unique set of API functions to allow for such increased efficiency and/or performance.

SUMMARY

A programming interface provides functions for generating applications, documents, media presentations and other content. These functions allow developers to obtain services from an operating system, object model service, or other system or service. In one embodiment, the functions allow a developer to generate a graphical user interface.

BRIEF DESCRIPTION OF THE DRAWINGS

The same reference numerals are used throughout the drawings to reference like components and features.

FIG. 3b is a more detailed diagram of the media namespace shown in FIG. 3a.

FIGS. 5, 6, 7, 8, 9, 10, 11, 12, 13, 14, 15 and 16 illustrate various example implementations of a programming interface.

DETAILED DESCRIPTION

Introduction

This disclosure addresses an application program interface (API) for a network platform upon which developers can build Web applications and services. More particularly, an exemplary API is described for operating systems that make use of a network platform, such as the .NET™ Framework created by Microsoft Corporation. The .NET™ Framework is a software platform for Web services and Web applications implemented in the distributed computing environment. It represents the next generation of Internet computing, using open communication standard to communicate among loosely coupled Web services that are collaborating to perform a particular task.

In the described implementation, the network platform utilizes XML (extensible markup language), an open standard for describing data. XML is managed by the World Wide Web Consortium (W3C). XML is used for defining data elements on a Web page and business-to-business documents. XML uses a similar tag structure as HTML; however, whereas HTML defines how elements are displayed, CML defines what those elements contain. HTML uses predefined tags, but XML allows tags to be defined by the developer of the page. Thus, virtually any data items can be identified, allowing Web pages to function like database records. Through the use of XML and other open protocols, such as Simple Object Access Protocol (SOAP), the network platform allows integration of a wide range of services that can be tailored to the needs of the user. Although the embodiments described herein are described in conjunction with XML and other open standards, such are not required for the operation of the claimed invention. Other equally viable technologies with suffice to implement the inventions described herein.

As used herein, the phrase application program interface or API includes traditional interfaces that employ method or function calls, as well as remote calls (e.g., a proxy, stub relationship) and SOAP/XML invocations.

Exemplary Network Environment

Figure 1:
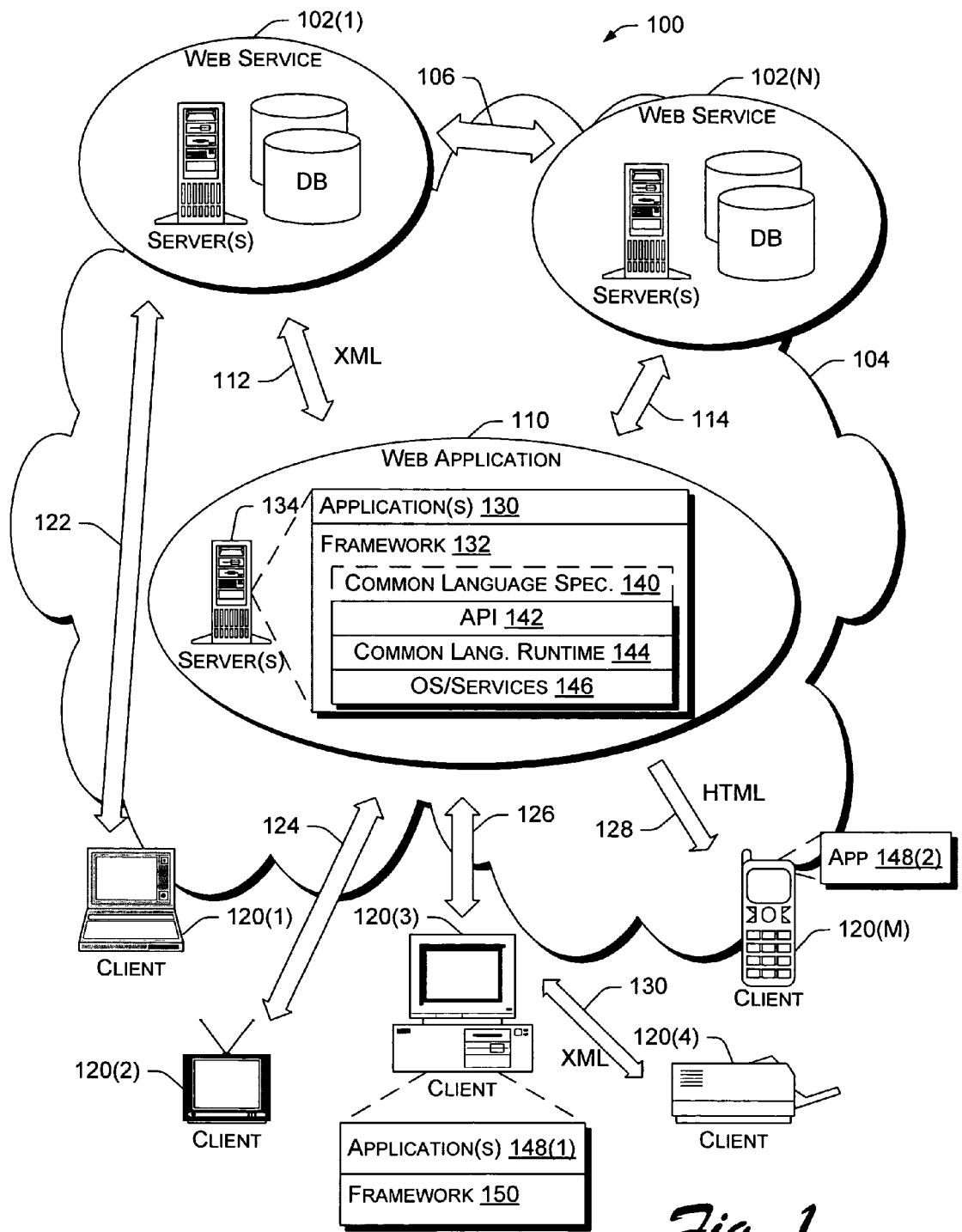
FIG. 1 illustrates a network architecture in which clients access Web services over the Internet using conventional protocols.

FIG. 1 shows a network environment 100 in which a network platform, such as the .NET™ Framework, may be implemented. The network environment 100 includes representative Web services 102(1), . . . , 102(N), which provide services that can be accessed over a network 104 (e.g., Internet). The Web services, referenced generally as number 102, are programmable application components that are reusable and interact programmatically over the network 104, typically through industry standard Web protocols, such as XML, SOAP, WAP (wireless application protocol), HTTP (hypertext transport protocol), and SMTP (simple mail transfer protocol) although other means of interacting with the Web services over the network may also be used, such as Remote Procedure Call (RPC) or object broker type technology. A Web service can be self-describing and is often defined in terms of formats and ordering messages.

Web services 102 are accessible directly by other services (as represented by communication link 106) or a software application, such as Web application 110 (as represented by communication links 112 and 114). Each Web service 102 is illustrated as including one or more servers that execute software to handle requests for particular services. Such services often maintain databases that store information to be served back to requesters. Web services may be configured to perform any one of a variety of different services. Examples of Web services include login verification, notification, database storage, stock quoting, location directories, mapping, music, electronic wallet, calendar/scheduler, telephone listings, news and information, games, ticketing, and so on. The Web services can be combined with each other and with other applications to build intelligent interactive experiences.

The network environment 100 also includes representative client devices 120(1), 120(2), 120(3), 120(4), . . . , 120(M) that utilize the Web services 102 (as represented by communication link 122) and/or the Web application 110 (as represented by communication links 124, 126, and 128). The clients may communication with one another using standard protocols as well, as represented by an exemplary XML link 130 between clients 120(3) and 120(4).

The client devices, referenced generally as number 120, can be implemented many different ways. Examples of possible client implementations include, without limitation, portable computers, stationary computers, tablet PCs, televisions/set-top boxes, wireless communication devices, personal digital assistants, gaming consoles, printers, photocopiers, and other smart devices.

The Web application 110 is an application designed to run on the network platform and may utilize the Web services 102 when handling and servicing request from clients 120. The Web application 110 is composed of one or more software applications 130 that run atop a programming framework 132, which are executing on one or more servers 134 or other computer systems. Note that a portion of Web application 110 may actually reside on one or more of clients 120. Alternatively, Web application 110 may coordinate with other software on clients 120 to actually accomplish its tasks.

The programming framework 132 is the structure that supports the applications and services developed by application developers. It permits multi-language development and seamless integration by supporting multiple languages. It supports open protocols, such as SOAP, and encapsulates the underlying operating system and object model services. The framework provides a robust and secure execution environment for the multiple programming languages and offers secure, integrated class libraries.

The framework 132 is a multi-tiered architecture that includes an application program interface (API) layer 142, a common language runtime (CLR) layer 144, and an operating system/services layer 146. This layered architecture allows updates and modifications to various layers without impacting other portions of the framework. A common language specification (CLS) 140 allows designers of various languages to write code that is able to access underlying library functionality. The specification 140 functions as a contract between language designers and library designers that can be used to promote language interoperability. By adhering to the CLS, libraries written in one language can be directly accessible to code modules written in other languages to achieve seamless integration between code modules written in one language and code modules written in another language. One exemplary detailed implementation of a CLS is described in an ECMA standard created by participants in ECMA TC39/TG3. The reader is directed to the ECMA web site at www.ecma.ch.

The API layer 142 presents groups of functions that the applications 130 can call to access the resources and services provided by layer 146. By exposing the API functions for a network platform, application developers can create Web applications for distributed computing systems that make full use of the network resources and other Web services, without needing to understand the complex interworkings of how those network resources actually operate or are made available. Moreover, the Web applications can be written in any number of programming languages, and translated into an intermediate language supported by the common language runtime 144 and included as part of the common language specification 140. In this way, the API layer 142 can provide methods for a wide and diverse variety of applications.

Additionally, the framework 132 can be configured to support API calls placed by remote applications executing remotely form the servers 134 that host the framework. Representative applications 148(1) and 148(2) residing on the clients 120(3) and 120(M), respectively, can use the API functions by making calls directly, or indirectly, to the API layer 142 over the network 104.

The framework may also be implemented at the clients. Client 120(3) represents the situation where a framework 150 is implemented at the client. This framework may be identical to server-based framework 132, or modified for client purposes. Alternatively, the client-based framework may be condensed in the event that the client is a limited or dedicated function device, such as a cellular phone, personal digital assistant, handheld computer, or other communication/computing device.

Developers' Programming Framework

Figure 2:
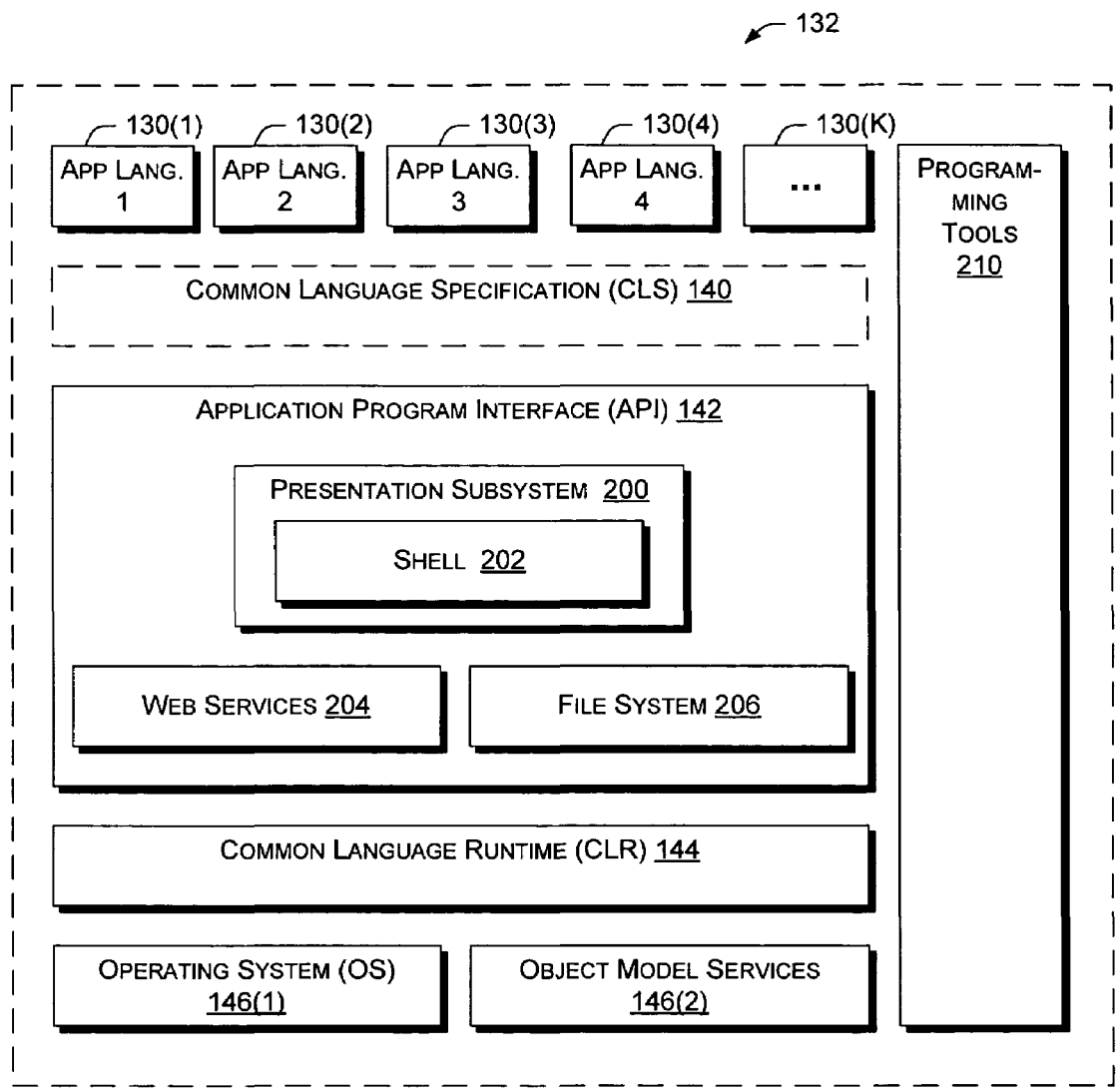
FIG. 2 is a block diagram of a software architecture for a network platform, which includes an application program interface (API).

FIG. 2 shows the programming framework 132 in more detail. The common language specification (CLS) layer 140 supports applications written in a variety of languages 130(1), 130(2), 130(3), 130(4), . . . , 130(K). Such application languages include Visual Basic, C++, C#, COBOL, Jscript, Perl, Eiffel, Python, and so on. The common language specification 140 specifies a subset of features or rules about features that, if followed, allow the various languages to communicate. For example, some languages do not support a given type (e.g., and "int*" type) that might otherwise be supported by the common language runtime 144. IN this case, the common language specification 140 does not include the type. On the other hand, types that are supported by all or most languages (e.g., the "int[ ]" type) is included in common language specification 140 so library developers are free to use it and are assured that the languages can handle it. This ability to communicate results in seamless integration between code modules written in one language and code modules written in another language. Since different languages are particularly well suited to particular tasks, the seamless integration between languages allows a developer to select a particular language for a particular code module with the ability to use the code module with modules written in different languages. The common language runtime 144 allow seamless multi-language development, with cross language inheritance, and provide a robust and secure execution environment for the multiple programming languages. For more information on the common language specification 140 and the common language runtime 144, the reader is directed to co-pending applications entitled "Method and System for Compiling Multiple Languages", filed Jun. 21, 2000 (Ser. No. 09/598, 289), which are incorporated by reference.

The framework 132 encapsulates the operating system 146 (1) (e.g., Windows®-brand operating systems) and object model services 146(2) (e.g., Component Object Model (COM) or Distributed COM). The operating system 146(1) provides conventional functions, such as file management, notification, event handling, user interfaces (e.g., windowing, menus, dialogs, etc.), security, authentication, verification, processes and threads, memory management, and so on. The object model services 146(2) provide interfacing with other objects to perform various tasks. Calls made to the API layer 142 are handed to the common language runtime layer 144 for local execution by the operating system 146(1) and/or object model services 146(2).

The API 142 groups API functions into multiple namespaces. Namespaces essentially define a collection of classes, interfaces, delegates, enumerations, and structures, which are collectively called "types", that provide a specific set of related functionality. A class represents managed heap allocated data that has reference assignment semantics. A delegate is an object oriented function pointer. An enumeration is a special kind of value type that represents named constants. A structure represents static allocated data that has value assignment semantics. An interface defines a contract that other types can implement.

By using namespaces, a designer can organize a set of types into a hierarchical namespace. The designer is able to create multiple groups from the set of types, with each group containing at least one type that exposes logically related functionality. In the exemplary implementation, the API 142 is organized to include three root namespaces. It should be noted that although only three root namespaces are illustrated in FIG. 2, additional root namespaces may also be included in API 142. The three root namespaces illustrated in API 142 are: a first namespace 200 for presentation subsystem (which includes a namespace 203 for a user interface shell), a second namespace 204 for web services, and a third namespace 206 for file system. Each group can then be assigned a name. For instance, types in the presentation subsystem namespace 200 can be assigned the name "Windows", and types in the file system namespace 206 can be assigned names "Storage". The named groups can be organized under a single "global root" namespace for system level APIs, such as an overall System namespace. By selecting and prefixing a top level identifier, the types in each group can be easily referenced by a hierarchical name that includes the selected top level identifier prefixed to the name of the group containing the type. For instance, types in the file system namespace 206 can be referenced using the hierarchical name "System.Storage". In this way, the individual namespaces 200, 204, and 206 become major branches off of the System namespace and can carry a designation where the individual namespaces are prefixed with a designator, such as a "System." Prefix.

The presentation subsystem namespace 200 pertains to programming and content development. It supplies types that allow for the generation of applications, documents, media presentations and other content. For example, presentation subsystem namespace 200 provides a programming model that allows developers to obtain services from the operating system 146(12) and/or object model services 146(2).

The shell namespace 202 pertains to user interface functionality. It supplies types that allow developers to embed user interface functionality in their applications, and further allows developers to extend the user interface functionality.

The web services namespace 204 pertains to an infrastructure for enabling creation of a wide variety of applications, e.g. applications as simple as a chat application that operates between two peers on an intranet, and/or as complex as a scalable Web service for millions of users. The described infrastructure is advantageously highly variable in that one need only use those parts that are appropriate to the complexity of a particular solution. The infrastructure provides a foundation for building message-based applications of various scale and complexity. The infrastructure or framework provides APIs for basic messaging, secure messaging, reliable messaging and transacted messaging. In the embodiment described below, the associated APIs have been factored into a hierarchy of namespaces in a manner that has been carefully crafted to balance utility, usability, extensibility and versionability.

The file system namespace 206 pertains to storage. It supplies types that allow for information storage and retrieval.

In addition the framework 132, programming tools 210 are provided to assit the developer in building Web services and/or applications. One example of the programming tools 210 is Visual Studio™, a multi-language suite of programming tools offered by Microsoft Corporation.

Root API Namespaces

Figure 3A:
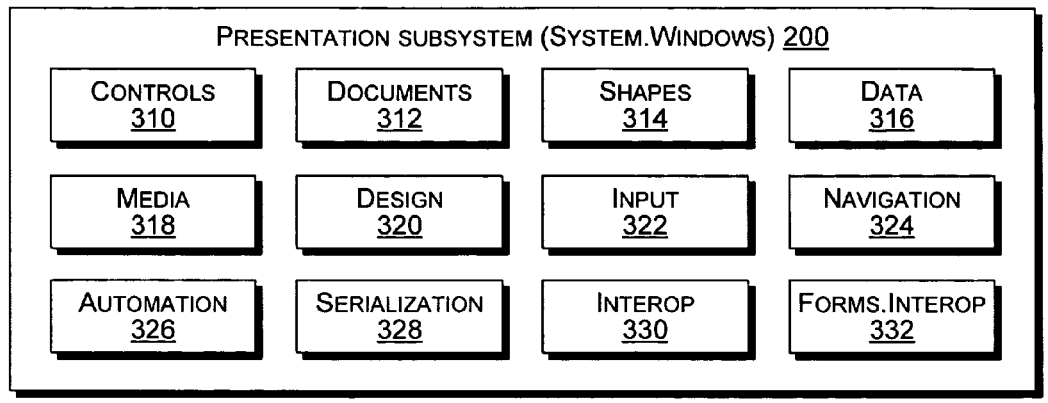
FIG. 3a is a block diagram of the presentation subsystem supported by the API, as well as function classes of the various API functions.

FIG. 3a shows a portion of the presentation subsystem 200 in more detail. In one embodiment, the namespaces are identified according to a hierarchical naming convention in which strings of names are concatenated with periods. For instance, the presentation subsystem namespace 200 is identified by the root name "System.Windows". Within the "System.Windows" namespace is another namespace for various controls, identified as "System.Windows.Controls", which further identified another namespace for primitives (not shown) known as "System. Windows. Controls.Primitives". With this naming convention in mind, the following provides a general overview of selected namespaces of the API 142, although other naming conventions could be used with equal effect.

As shown in FIG. 3, the presentation subsystem 200 includes multiple namespaces. The namespaces shown in FIG. 3a represent a particular embodiment of the presentation subsystem 200. Other embodiments of the presentation subsystem 200 may include one or more additional namespaces or may omit one or more of the namespaces shown in FIG. 3a.

The presentation subsystem 200 is the root namespace for much of the presentation functionality of the API 142. A controls namespace 310 includes controls used to build a display of information, such as a user interface, and classes that allow a user to interact with an application. Example controls include "Button" that creates a button on the display, "RadioButton" that generates a radio-style button on the display, "Menu" that creates a menu on the display, "ToolBar" that creates a toolbar on the display, "Image" that generates an image on the display and "TreeView" that creates a hierarchical view of information.

Certain controls are created by nesting and arranging multiple elements. The controls have a logical model that hides the elements used to create the controls, thereby simplifying the programming mode. The controls can be styled and themed by a developer or a user (e.g., by customizing the appearance and behavior of user interface buttons). Some controls have addressable components that allow an individual to adjust the style of individual controls. Additionally, the controls can be sub-classed and extended by application developers and component developers. The controls are rendered using vector graphics such that they can be resized to fit the requirements of a particular interface or other display. The controls are capable of utilizing animation to enhance, for example, the interactive feel of a user interface and to show actions and reactions.

Controls Namespace

The controls namespace 310 includes one or more panels, which are controls that measure and arrange their children (e.g., nested elements). For example, a "DockPanel" panel arranges children by docking each child to the top, left, bottom or right side of the display, and fills-in the remaining space with other data. For example, a particular panel may dock menus and toolbars to the top of the display, a status bar to the bottom of the display, a folder list to the left side of the display, and fills the rest of the space with a list of messages.

As mentioned above, System.Windows.Controls.Primitives is a namespace that includes multiple controls that are components typically used by developers of the controls in the Syste.Windows.Controls namespace and by developers creating their own controls. Examples of these components include "Thumb and RepeatButton". "ScrollBar", another component, is created using four repeat buttons (one for "line Up", one for "line down", one for "page up", and one for "page down") and a "Thumb" for dragging the current view to another location in the document. In another example, "ScrollViewer" is a control created using two "ScrollBars" and one "ScrollArea" to provide a scrollable area.

Documents Namespace

A documents namespace 312 is a collection of semantic and formatting elements that are used to create richly formatted and semantically rich documents. In one embodiment, an "element" is a lass that is primarily used in conjunction with a hierarchy of elements (referred to as a "tree"). These elements can be interactive (e.g., receiving user input via keyboard, mouse or other input device), can render images or objects, and can assist with arrangement of other elements. Example elements include a "Block" element that implements a generic block, a "Body" element that represents content that includes the body of a table, "Cell" element that contains tabular data within a table, a "Header" element that represents the content included in the header of a table, and a "PageBreak" element that is used to break content across multiple pages.

Shapes Namespace

A shapes namespace 314 is a collection of vector graphics elements that is used to create images and objects. Example elements include an "Ellipse" element that draws an ellipse, a "Line" element that draws a straight line between two points, a "Rectangle" element that draws a rectangle, and a "Polygon" element that draws a polygon as a connected series of lines that form a closed shade.

Data Namespace

A data namespace 316 includes classes and interfaces used to bind properties of elements to data sources, data source classes, and data-specific implementations of data collections and views. These classes and interfaces are also used to handle exceptions in data entry and allow runtime creation of user interface based on information in various data sources. Data can be displayed in textual form or can be utilized to change the formatting of the display, such as displaying dollar amounts in red if they are negative. Example classes include a "Bind" class that represents a binding declaration object that manages bindings between a dynamic property user interface and source data, and an "XmlDataSource" class that serves as a data source for data binding to XML content nodes.

Object-oriented applications typically represent data by classes that define both the value of a piece of data and the operations that can be performed on that data. The term "data item" refers to one such object. Applications can handle individual data items or collections of data items. They may use data items in three ways: (a) converting data from external sources such as file systems, remote servers, databases, etc. into the corresponding in-memory data items, and converting modified data items back into the form expected by these sources; (b) operating on the data items using a combination of data-centric and application-centric logic; (c) presenting the data embodied by the data items to the user through a user interface. Data namespace 316 provides support for the first and third of these tasks.

The first task, obtaining data from external sources, is supported by "data source" objects. A data source object is typically defined as a page-wide or application-wide resource, and serves as the gateway to the data. Data sources implement an IDataSource interface, which defines a standard mechanism by which the classes in the data namespace get access to the data. A particular data source object implements logic for retrieving the actual data by using mechanisms appropriate for the particular source. In one embodiment, the data namespace includes four data source classes:
1. XmlDataSource, for retrieving data represented as XML
2. SqlDataSource, for retrieving data from SQL databases, such as Microsoft SQLServer
3. WinFSDataSource, for retrieving data from the WinFS service
4. ObjectDataSource, for retrieving data from an arbitrary object defined by the application Applications can also define their own data source classes that are tailored to special-purpose sources.

A data source class is responsible for retrieving data from an external source and converting it into one or more data items suitable for use by the binding classes. If a collection of data items is needed, the application can use any of the standard collection classes from the .Net Framework such as Array, ArryLisa, Hashtable, etc., any of the data-centric collection classes from the System.Data namespace such as Dataset, or a data-centric collection class from the data namespace such as ArrayListDataCollection. The latter classes support change notification; i.e., when the application changes the collection by adding an item, sorting the collection, etc., the collection sends a notification. The binding classes listen for these notifications and automatically update the user interface to reflect the change.

Once the data has been converted to in-memory data items, the application can perform computations using the items and an modify the items as a result of the computations. These actions are performed using a combination of data-centric operations (defined by the data item classes) and application0centric operations (defined by the applications itself). The actions may be initiated by the application automatically, or in response to an action of the user. Special support or cooperation from the data namespace is not necessary, thereby providing a clean separation of logic and presentation within the application.

The third data-related task, presenting the data through the user interface, is supported by the "binding" classes of the data namespace. These classes enable the application to describe the correspondence (binding) between a data item property (the source) and a user interface property (the target). The term data-binding (or simply binding) refers to the establishment of such a correspondence. For example, an application may choose to data-bind the Text property of a Textbox control the CustomerName property of a data item. Having done so, the control will automatically display the customer's name, updating the display element, or from the value of the target element's DataContext property.

UpdateType—when to update the source property in a two-way binding: one of Immediate, OnLostFocus, or Explicit. Immediate updates happen as soon as the user interface property changes. OnLostFocus updates are delayed until the target element loses keyboard focus— this is appropriate for a TextBox control, to avoid the expense of updating after every keystroke. Explicit updates happen when the application explicitly calls for them.

Transformer—an object that implements the IDataTransformer interface. This gives the application a way to modify the data item value before using it in the user interface. The modification can be a s simple type conversion (e.g., in a binding of the Background property to the BalanceOwed data property, the application can convert a negative balance to a red background and a positive balance to green) or an application-specific conversion (e.g., in a binding of the Text property to the NetWorth data property, the application can display "Rich" if the NetWorth exceeds $1M, "Bourgeois" if the NetWorth lies between $00K and $M, and "Poor" if the NetWorth is less than $100K). Transformers are a simple yet powerful tool that help separate presentation from data.

All bindings except one-time rely on getting notified when the data property changes, so that the corresponding change can be made to the user interface. The binding classes recognize the IPropertyChange interface (from the System.ComponentModel namespace) as one way of implementing the required notifications.

The following tables list the members exposed by the System.Windows.Data namespace.

Classes
ArrayListCollectionView Encapsulates the collection view support for the ArrayListDataCollection collection class. This class cannot be inherited.

ArrayListDataCollection Provides a built-in implementation of an array-list data collection with an underlying collection-view interface. It also implements ICollectionChange to provide notification when items are added, items are removed, or the whole collection is refreshed.

Bind Represent a bind declaration object, used to manage binding between a dynamic property user interface (UI) and source data.

Binding Provides access to the single run-time instance of a binding. This class cannot be inherited.

BindingListCollectionView A collection view class used for Microsoft® ActiveX® Data Objects (ADO) data views.

CollectionContainer Objects of this class hold an existing collection structure—for example, an ArrayListDataCollection or some other DataSet inside the ItemCollection.

ContextAffinityCollectionView Implements a collection view that includes checks for context affinity.

DataContextObjectRef Supports object references to objects being used as data context for a binding. This class cannot be inherited.

DataSourceObjectRef Supports object references to data sources. This class cannot be inherited.

DataTransferEventArgs Encapsulates arguments for data transfer events. The events are routed events that must be handled specifically by a designated handler based on the DataTransferEventHandler delegate.

ElementObjectRef Represents an object reference to an element, with the object being specified by its element ID. This class cannot be inherited.

ExplicitObjectRef Represents and explicit object reference to an element. This class cannot be inherited.

LisCollectionView Implements a collection view for collections based on IList.

ObjectDataSource Serves as a data source for data binding. Bindable data items can be specified as common language runtime types.

ObjectRef The abstract class that is used as the parent class of ElementObjectRef, ExplicitObjectRef, and TypeObjectRef.

ParameterCollection Objects of this class hold the collection named parameters (with their corresponding values) of ran SqlDataSource.

QueryCommand This class represent a single select statement to be submitted to the database.

RefreshCompletedEventArgs Encapsulates the arguments passed either in the RefreshCompleted event of ObjectDataSource, or in the RefreshCompleted event of XmlDataSource.

SqlCommandList A list of sql commands and the names of the tables that they should be used to fill.

SqlDataSource SqlDataSource gets data from a Microsoft SQL Server for use in databinding.

TransformerSource Allows resource reference to a transformer class that is defined as code-behind in the current application.

TypeObjectRef Supports object reference by type. This class cannot be inherited.

WinFSDataSource The WinFSDataSource facilitates databinding of data stored in WinFS with Avalon applications.

XmlDataNamespaceManager XmlDataNamespaceManager Class Used to declare namespaces to be used in Xml data binding XPath queries.

XmlDataSource Serves as a data source for data binding to Extensible Markup Language (XML) content nodes.

XmlNamespace Declares an individual namespace within in XML data source.

Interfaces
  IContains Used to Create classes that declare filtering criteria for collection views.
  IdataSource Supports creation of data source objects. Data source objects are used for common representation of data for data binding.
  IdataTransformer Provides methods that enable client-side transformation of bound data.

Enumerations
  BindFlags Describes special properties of a binding. See Using Bind Declarations for "Longhorn" markup language (code-named "XAML") usage. See BindType for the enumeration that is used to specify binding type (one-way, two-way and so on).
  BindStatus Status of Binding
  BindType Describes how changes in data values will transfer to and from source properties and target properties of a binding.
  SqlDataSourceMode The enumeration of the possible modes that SqlDataSource can have. The mode determines what sort of data is returned when the application retrieves the value from the Data property.
  UpdateType Specifies when updates to the data source (target-to-source data transfer) should occur in a binding. Setting these values will only be relevant if a binding's BindType is set to TwoWay (or left as the default).

Delegates
  DataChangedEventHandler Represents the method that handles the DataChanged event raised by data sources that implement IDataSource.
  DatTransferEventHandler Represent the method that handles a data transfer event raised by Binding.
  RefreshCompletedEventHandler Represents the method that handles the ObjectDataSource.RefreshCompleted and XmlDataSource.RefreshCompleted events.

Media Namespace

A media namespace 318 provides various media classes. Application developers as well as component developers may use these classes to develop various presentation functionality. Example classes in media namespace 318 include an "ImageEffect" class that permits certain imaging effects (e.g., blur and grayscale), and "Brush" class that provides a mechanism for filling an area using solid colors, gradients, images, video, and the like.

Figure 3B:
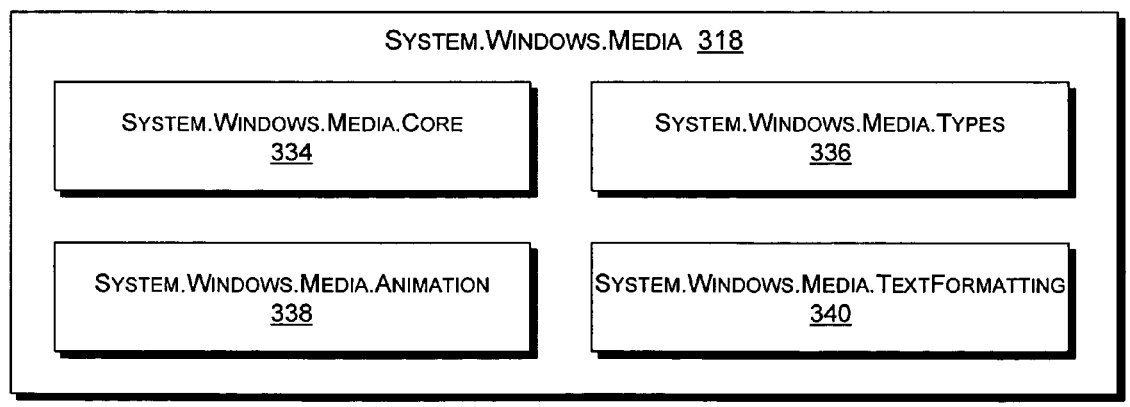

FIG. 3b provides an illustration of the media namespace shown in FIG. 3a in greater detail. The media namespace 318 as shown in FIG. 3b, also known as System.Windows.Media, includes a sub-namespace System.Windows.Media.Core 334 that provides audio and video classes that function within and across PCs. These class functionalities include, but are not limited to, Recording/Editing/Playback of media, Digital Rights Management of content, and manipulating metadata of media. Moreover, the media namespace 318 also includes the sub-namespace System.Windows.Media.Types 336. This sub-namespace contains classes that describe various media types such as audio, video, script, html, and so on. The descriptions include, for example, information such as bitrate, format type . . . etc.

The media namespace 318 also includes the sub-namespace System.Windows.Media.Animation 338, which includes services that allow a developer to animate properties and coordinate a set of animations with a set of timelines. An animation is an object that changes a value over a period of time. Animation effects include moving an object on the display, and changing the size, shape, or color of an object. Multiple animation classes are provided to implement various animation effects. Effects can be achieved by associating an animation with an element's property value. For example, to create a rectangle that fades in and out of view, on or more animations are associated with the opacity property of the rectangle.

Still referring to FIG. 3b, the media namespace 318 also includes a sub-namespace System.Windows.Media.TextFormatting 340 that provides various text services. For example, a "TextFormatter" text engine provides services for breaking text lines and formatting text presented on a display. "TextFormatter" is capable of handling different text character formats and paragraph styles as well as handling international text layout.

The following tables list example members exposed by the media 318 namespace, System.Windows.Media. Appendix A provides additional detailed information regarding the System.Windows.Media namespace 318.

Classes
  ArcSegment Represents an elliptical arc between two points.
  AudioData Enables playing of audio files according to the state of a time node.
  AudioDataConverter AudioDataConverter
  BezierSegment Represents a cubic Bézier curve drawn between two points.
  Brush Provides a generic means for filling an area using solid colors (SolidColorBrush), gradients (LinearGradientBrush, RadialGradientBrush), images (ImageBrush), video, and more.
  BrushConverter Used to convert a Brush object to or from another object type.
  Brushes Implements a set of predefined solid colors.
  CloseSegment Represents a line that connects the last point of a PathFigure object with its starting point.
  CodecFilter Filter for enumerating codecs. Only those codecs that match the properties will be enumerated.
  CodecInfo Information about a specific codec and a factory for creating the codec. This is returned from the codec enumerator.
  ColorCollection
  ColorCollectionConverter ColorCollectionConverter—Converter class for converting instances of other types to and from ColorCollection instances
  ColorContext
  ColorConverter Used to convert a Color object to or from another object type.
  Colors Implements a set of predefined colors.
  ContainerVisual Manages a collection of Visual objects.
  DashArrays DashArrays—The DashArrays class is static, and contains properties for well known dash styles.
  DoubleCollection
  DoubleCollectionConverter DoubleCollectionConverter—Converter class for converting instances of other types to and from DoubleCollection instances
  Drawing A Drawing is a list of 2d drawing primitives.
  DrawingBrush DrawingBrush—This TileBrush defines its content as a Drawing.
  DrawingContext Drawing context.
  DrawingVisual Visual that contains graphical content to be drawn.
  Ellipse Geometry Represents the geometry of a circle or ellipse.
  FontFamily Font family
  FormattedText The FormattedText class is a part of Avalon MIL easy text API, which is targeted at programmers needing to add some simple text to a MIL visual.
  Geometry An abstract class that provides base functionality for all geometry classes, such as EllipseGeometry, RectangleGeometry, and PathGeometry. The Geometry class of objects can be used for clipping, hit-testing, and rendering 2-D graphic data.
  GeometryCollection Represents a collection of Geometry objects.
  GetPageEventArgs class GetPageEventsArgs
  GlyphRun Glyph run class
  GlyphTypeface Physical font face corresponds to a font file on the disk
  GradientBrush An abstract class that describes a gradient fill. Classes that derive from GradientBrush describe different ways of interpreting gradient stops.
  GradientStop Describes the location and color of a transition point in a gradient.
  GradientStopCollection Represent a collection of GradientStop gradient stops.
  HitTestParameters This is the base class for packing together parameters for a hit test pass.
  HitTestResult This base returns the visual that was hit during a hit test pass.
  HwndInterop HwndInterop
  HwndVisual
  HyphenationCandidate Describes on Hypenation candidate.
  ICCProfile
  ImageBrush Fills an area with an image. This class may be used to specify images as the fill or background of other objects.
  ImageCodecCollection The collection of codecs (actually CodecInfos) on the system.
  ImageCodecEnumerator The enumerator for Image frames.
  ImageColorTransform ImageColorTransform Performs color management on an imaging pipeline.
  ImageData Contains an image and related data.
  ImageDataBuilder This object is used to build and ImageData object.
  ImageDecoder ImageDecoder is a container for image frames. Each image frame is an ImageSource. Unlike ImageSource, ImageDecoder is NOT an immutable object and can be re-initialized to a different image stream. However, any ImageSources (frames) that it returns must be immutable.
  ImageDecoderBmp The built-in Microsoft BMP (Bitmap) Decoder.
  ImageDecoderGif The built-in Microsoft GIF Decoder.
  ImageDecoderIcon The built-in Microsoft Icon Decoder.
  ImageDecoderInternal For internal use only.
  ImageDecoderJpeg The built-in Microsoft Jpeg Decoder
  ImageDecoder Png The built-in Microsoft PNG Decoder
  ImageDecoderTiff The built-in Microsoft Tiff Decoder.
  ImageEffect The ImageEffect class is the base class for all imaging effects (blur, grayscale, etc). It's possible for an effect to not have any inputs but an effect must always have at least one output. The default implementations of things assume this. If a derived effect is going to play with Output/Outputs be sure that at least one is there.
  ImageEffectBlur Gaussian blur effect. It is a single input, single output effect. Warning: If the effect is being called (i.e. Input.ScaleX or Input.ScaleY isn't 1) and Expand is true, then it's possible for the output dimensions to be larger or smaller that PixelWidth and PixelHeight. Adjust the pixel buffer fed to copy to avoid problems.
  ImageEffectFlipRotate This effect can flip an image in X or Y and rotate by multiples of 90 deg
  ImageEffectGammaCorrect This effect changes the gamma of an image ImageEffectGlow Performs a glow effect. It is a single input, single output effect.

ImageEffectGrayscale Converts an image to grayscale. It is a single input, single output effect.

ImageEffectNegate Negates an image. It is a single input single output effect.

ImageEffectSource ImageEffectSource class Implementation

ImageEffectSourceCollection The collection of image effect outputs

ImageEffectTint Tint constructor. It is a single input, single output effect.

ImageEncoder ImageEncoder collects a set of frames (ImageSource's) with their associated thumbnails and metadata and save them to a specified stream. In addition to frame specific thumbnails and metadata, there can also be an image-wide (global) thumbnail and metadata, if the codec supports it.

ImageEncoderBmp Built-in Encoder for Bmpfiles.

ImageEncoderGif Built-in Encoder for Gif files.

ImageEncoderInternal ImageEncoderInternal collects a set of frames (ImageSource's) with their associated thumbnails and metadata and saves them to a specified stream. In addition to frame-specific thumbnails and metadata, there can also be an image-wide (global) thumbnail and metadata, if the codec supports it.

ImageEncoderJpeg Built-in Encoder for Jpeg files.

ImageEncoderPng Built-in Encoder for Png files.

ImageEncoderTiff Built-in Encoder for Tiff files.

ImageExchangeMetaData ImageExchangemetaData This class is used to access and set metadata for ImageFiles which have Exif style metadata. MetaData is stored as Key/Value pairs, where Keys are not necessarily unique. This class provides generic access to all meta data within an image, as well as exposes CLR properties for certain well-known properties.

Image ExchangeProperty ImageExchangeProperty—a tuple of an ImageExchangeID and the object which is the value of that property ImageMetaData ImageMetaData This class is used to access and set metadata for Images. This class also exposes a CodecMetaData property accessing the metadata for this image.

ImagePalette ImagePalette class

ImageSizeOptions Sizing options for an image. The resulting image will be scaled based on these options.

ImageSource Defines the methods, properties, and events for the imaging pipeline, including decoders and effects.

ImageSourceCollection The collection of codecs (actually ImageSource's) on the system.

ImageSourceConverter ImageSourceConverter

IntegerCollection

IntegerCollectionConverter IntegerCollectionConverter—Converter class for converting instances of other types to and from IntegerCollection instances.

LinearGradientBrush Defines a linear gradient used to fill and area.

LineGeometry Represents a geometry of a line.

LineSegment Represents a line between two points. Unlike LineGeometry objects, LineSegment must be contained within a PathFigure.

MatrixTransform Creates an arbitrary affine matrix transformation used to manipulate objects or coordinate systems in a two-dimensional plane.

MedaData MediaData. Use to playback Audio/Video content.

MedaSystem The MediaSystem class controls the media layer.

NineGridBrush Fills an entire area with an image. Portions of the image are stretched to fit within defined margins.

PathFigure Represents a sub-section of a geometry, a single connected series of two-dimensional geometric segments.

PathFigureCollection

PathFigureConverter PathFigureConverter

PathGeometry Represent a complex shape that may be composed of arcs, curves ellipses, lines, and rectangles.

PathGeometryConverter PathGeomtryConverter

PathSegment An abstract class that represents a segment of a PathFigure object. Classes that derive from PathSegment, such as ArcSegment, BezierSegment, and LineSegment, represent specific types of geometric segments.

PathSegmentCollection Represents a list of PathSegment objects.

PathSegmentConverter PathSegmentConverter

Pen Describes how a shape is outlined.

PixelFormats PixelFormats—The collection of supported Pixel Formats

PointCollection

PointCollectionConverter PointCollectionConverter—Converter class for converting instances of other types to and from PointCollection instances.

PointHitTestParameters This is the class for specifying parameters hit testing with a point.

PointHitTestResult This class returns the point and visual hit during a hit test pass.

PolyBezierSegment PolyBezierSegment

PlyLineSegment PolyLineSegment

PolyQuadraticBezierSegment PolyQuadraticBezierSegment

PrintContext PrintContext holds state and context for a printer interation

QuadraticBezierSegment QuadraticBezierSegment

RadialGradientBrush Defines a radial gradient used to fill an object. A focal point defines the beginning of the gradient, and a circle defines the end point of the gradient.

RectangleGeometry Represents the geometry of a rectangle.

RetainedVisual RetainedVisual

RotateTransform Used to rotate an object about a specified point in the two-dimensional x-y plane.

ScaleTransform Scales and object in the two-dimensional x-y plane, starting from a defined center point. Scale factors are defined in x- and y-directions from this center point.

SkewTransform Represent a two-dimensional skew.

SolidColorBrush Represent a solid, uniform fill.

StartSegment StartSegment

SubLineCollection Collection of subline. Subline can be object of one of these types of Glyphrun Lineover Inline object TileBrush Abstract class that describes a way to fill a region with one or more "tiles." Derived classes define the different types of tiles that can be used; for example, the ImageBrush enables you to fill an area with an image.

Transform An abstract class that you use as the parent class of all types of transformations in a two-dimensional place, including rotation (RotateTransform), scal (ScaleTransform), skew (SkewTransform), and translation (TranslateTransform). This class hierarchy differs from the Matrix structure both because it is a class and because it supports animation and enumeration semantics.

TransformCollection Used to create and manipulate a list of Transform objects.

TransformConverter Used to convert a Transform object to or from another object type.

TranslateTransform Translates an object in the two-dimensional x-y place.

Typeface A Typeface is a combination of family, weight, style and stretch:

VectorCollection

VectorCollectionConverter VectorCollectionConverter—Converter class for converting instances of other types to and from VectorCollection instances.

VideoData Enables playing of video files according to the state of a time node.

VideoDataConverter VideoDataConverter

Visual Base class for all Visual types. It provides services and properties common to all Visual, including hit-testing, coordinate transformation, and bounding box calculations.

VisualCollection An ordered collection of Visual objects.

Visual Manager Renders a tree of Visual objects to a rendering target, typically a window.

Interfaces

IHyphenate IHyphenate is the interface for Hyphenation Service Provider

IRetainedRender If this interface is implemented on a class that is derived from RetainedVisual, the RetainedVisual operation sin validation mode, i.e. the graphics subsystem will call OnRender in a lazy fashion. (e.g. if the Visual appears for the first time on the screen). Note that OnRender can be called by the system anytime.

IVisual This Interface defines the common methods and services available from Visual object.

Enumerations

BrushMappingMode BrushMappingMode—Enum which describes whether certain values should be considered as absolute local coordinates or whether they should be considered multiples of a bounding box's size.

ChannelDescription Describes order of each channel of pixel data

ColorInterpolationMode ColorInterpolationMode—This determines how the colors in a gradient are interpolated.

Combinemode Specifies the method used to coming two geometric areas.

FillRule

GradientSpreadMethod Specifies how the gradient should be drawn outside of the specified gradient vector or space.

HitTestFilterBehavior Behavior for filtering visual while hit testing

HitTestResultBehavior Enum controls behavior when a positive hit occurs during hit testing.

HorizontalAlignment The HorizontalAlignment enum is used to describe how content is positioned horizontally within a container.

HyphenationRule Supported Hyphenation Rules.

ImagePaletteType Pre-defined palette types

MedaState Holds the current state of the Media

PenDashCap PenDashCap—Enum which describes the drawing of the ends of a dash within a dashed line.

PenLineCap Describes the shape at the end of a line or segment.

PenLineJoin PenLineJoin—Enum which describes the drawing of the corners of the line.

Rotation The rotation to be applied; only multiples of 90 degrees supported.

StandardColorSpace

Stretch Stretch—Enum which describes how a source rect should be stretched to fit a destination rect.

StyleSimulations Font style simulation

TiffCompressOptions Compress options for saving TIFF image

Tile Mode TileMode—Enum which describes the drawing of the ends of a line.

VerticalAlignment The VerticalAlignment enum is used to describe how content is positioned vertically within a container.

Structures

CharacterIndexer This class is a helper to implement named indexers for characters. Color Represents colors in terms of alpha, red, green, and blue channels.

GlyphIndexer This class is a helper to implement named indexers for glyph metrics.

ImageExhangeID ImageExchangeID—this class is the type which can be used as the key for a property in an ImageMetaData instance. This can be either and integer or a string.

ImageExchangeMetaDataEnumerator ImageExchangeMetaDataEnumerator The enumerator for ImageExchangeMetaData. Contains IEnumerator interface as well as strongly typed versions of the APIs ImageFramEnumerator The enumerator for Image frames.

ImageMetaDataRational An ImageMetaDataRational class is represented as a signed numerator and a signed denominator. The effective value of a rational is the numerator/denominator ImagePaletteColor ImagePaletteColor structure IntegerRect A rect composed of integer values. Typically used to specify the source rect (in pixels) of interest from an image.

Matrix Represents a 3×3 matrix used for transformations in two-dimensional space. Because "Avalon" only allows affine transformations, the Matrix structure has six entries instead of nine.

NamedStringIndexer This class is helper to implement named indexers for strings localized in multiple cultures.

PixelFormat Pixel Format Definition for images and pixel-based surfaces.

Delegates

GetPageEventHandler Delegate GetPageEventHandler

HitTestFilterDelegate Delegate for hit tester to control whether to test against children of visual.

HitTestResultDelegate Delegate for hit tester to control returning of a hit information on visual The following tables list example of members exposed by the System.Windows.Media.Animation 338 sub-namespace.

Classes

Animatable Any class that doesn't derive from DependencyObject but which has properties that can be animated should derive from this class.

AnimationCollection This abstract class provides base functionality for animation collection, such as ColorAnimationCollection, DoubleAnimationCollection, and SizeAnimationCollection.

AnimationEffect Override this class to implement element level animations which can participate in the rendering process to instantiate animations on multiple elements at rendering time.
AnimationEffectCollection Holds a collection of AnimationEffects.
BoolAnimationCollection Represent a collection of BoolModifier animations.
BoolModifier
BoolTimedModifier
BytAnimationColleciton Represent a collection of BoolModifier animations.
ByteModifier
ByteTimedModifier
CharAnimationCollection Represents a collection of CharModifier animations.
CharModifier
CharTimedModifier
ColorAnimation Animates a color value of a property.
ColorAnimationCollection Represent a collection of ColorModifier animations.
ColorKeyFrameCollection
ColorModifier
ColorTimedModifier
DecimalAnimationCollection Represents a collection fo DecimalModifier animations.
DecimalModier
DecimalTimedModifier
DoubleAnimation Used to animate properties that accept a Double value
DoubleAnimationCollection Represents a collection of DoubleModifier animations.
DoubleKeyFrameCollection
DoubleModifier
DoubleTimedModifier
FloatAnimation Used to animate properties that accept a Single value.
FloatAnimationCollection Represents a collection of FloatModifier Animations.
FloatKeyFramecollection
FloatModifier
FloatTimed Modifier
IntAnimationCollection Represents a collection of IntModifier animations.
IntModifier
IntTimedModifier
LengthAnimation Used to animate properties that accept a Length value.
LenghtAnimationCollection Represents a collection of LengthModifier animations.
LegthKeyFramecollection
LengthModifier
LengthTimedModifier
LongAnimationCollection Represents a collection of LongModifier animations.
LongModifier
LongTimedModifier
MatrixAnimationCollection Represents a collection of MatrixModifier animations.
MatrixModifier
MatrixTimedModifier
Modifier
ObjectAnimationCollection Represents a collection of ObjectModifier animations.
ObjectModifier
ObjectTimedModifier
PathAnimation This animation can be sued inside of a MatrixAnimationCollection to move a visual object along a path.
PointAnimation Used to animate properties that accept Point Values.
PointAnimationCollection Represents a collection of PointModifier animations.
PointKeyFrameCollection
PointModifier
PointTimedModifier
RectAnimation Used to animate properties that accept a Rect value.
RectAnimationCollection Represents a collection of RectModifier animations.
RectKeyFrameCollection
RectModifier
RectTimedModifier
ShortAnimationCollection Represents a collection of ShortModifier animations.
ShortModifier
ShortTimedModifier
SizeAnimation Defines an animation based on the Size of an object. By providing Size information, an object can appear to shrink or enlarge over a period of time.
SizeAnimationCollection Represents a collection of SizeModifier animations.
SizeKeyFrameCollection
SizeModifier
SizeTimedModifier
StringAnimationCollection Represents a collection of StringModifier animations.
StringModifier
StringTimedModifier
Timeline Maintains run-time timing state for timed objects.
TimelineBuilder An abject that can be sued to create Timeline objects.
TimeManager The object that controls an entire timing tree.
TimeSyncValueTypeConverter An object that performs type conversions involving TimeSyncValue values.
TimeTypeConverter An object that performs type conversions involving Time values.
VetorAnimation Used to animate properties that accept a Vector value.
VectorAnimationCollection Represents a collection of VectorModifier animations.
VectorKeyFrameCollection
VectorModifier
VectorTimedModifier Interfaces
  IClock Represents an object that can provide linear time values.
  IModifier Defines the basic behavior of a modifier object. A modifier is an object that takes an object, called the base value, of a certain type and returns another object of the same type as its output.
  ITimingControl Defines the behavior of timelines and times objects.
  ITimingControlBuilder Represents an object that can build a timeline template.

Enumerations
  AnimationType Describes the behavior of an animation.
  CloneType The types of clones that CloneCore may request.

InterpolationMethod Describes how an animation calculates its output values.

KeyTimeType The different types of KeyTimes

TimeEndSync Values for the endSync attribute, which specifies how a container calculates its simple duration based on the children's durations.

TimeFill Specifies how the timeline behaves after it is no longer active.

TimeRestart Values for the Timeline.Restart attribute.

TimeSeekOrigian Indicates a timeline position; used to specify the behavior of the ITimingControl interface's Seek method by defining the position to which the offset is applied.

TimeSyncBase The event to synchronize a begin or end value to.

Structures

ColorKeyFrame

DoubleKeyFrame

FloatKeyFrame

KeySpline This class is used to pass an array of key splines into the KeySplines property of an animation fragment.

KeyTime A KeyTime is use to specify when relative to the time of an animation that a KeyFrame takes place.

LengthKeyFrame

PointKeyFrame

RectKeyFrame

SizeKeyFrame

Time A value representing time, with associated time arithmetic operations.

TimelineEnumerator Enumerates items in an TimelineList Collection

TimeSyncValue A value representing an absolute or relative begin or end time for a timeline.

VectorKeyFrame

The following tables list example members exposed by the System.Windows.Media.TextFormatting 340 sub-namespace.

Classes

InlineObjectInfo Provides measurement details for inline text objects. The formatting client passes this object as a parameter to the GetInlineObjectInfo method.

TextFormatter TextFormatter is the "Avalon" text engine and provides services for formatting text and breaking text lines. TextFormatter can handle different text character formats and paragraph styles, and includes support for international text layout.

TextHighlightBounds Bound of text range

TextInfo Represents information about a block of text in the client's text source character store.

TextLine Provides services to a line of text. Inherit from this class to implement services that manipulate and format a line of text. This is an abstract class.

TextMarkerGeneratedContent Generates line list marker output.

TextMarkerInfo Defines the style and type of a paragraph's list marker. The formatting client uses this class as a parameter to provide marker details to the GetTextMarkerInfo method.

TextParagraphProperties Represents properties that can change from one paragraph to the next, such as flow direction, alignment, or indentation.

TexRun Defines a sequence of characters that share a single property set. The formatting client provides TextRun details into this class when the TextFormatter passes it as a parameter to the GetTextRun method.

TextRunBounds Bound of text run

TextRunCache Provides caching services to the TextFormatter object in order to improve performance.

TextRunClientData Represents client information data associated with a TextRun.

TextRunProperties Provides properties that can change form one TextRun to another, such as typeface or foreground brush. This is an abstract class.

TextRunTypographyProperties Provides typography properties for TextRun. This client set of properties generates a set of features that are processed by the OpenType layout engine.

TextSource Provides character data and formatting properties to the TextFormatter. All access to the text in the TxtSource is achieved through the GetTextRun method, which is designed to allow the client to virtualize text in any way it chooses. This is an abstract Class.

TextTrimmingInfo Provides description of text trimming characteristics. The formatting client fills trimming details into this class when the TextFormatter passes it as a parameter of the GetTextTrimmingInfo method.

Enumerations

TextParagraphFlags Flags describing paragraph characteristics

TextRunCacheFlags Kind of content in text run cache

TextRunType Indicates the type of TextRun.

Structures

TestSourceCharacterIndex TextSourceCharacterIndex represents a caret or character position in the text.

The following tables list example members exposed by the System.Windows.Media.Core 334 sub-namespace. Appendix B provides additional detailed information regarding the System.Windows.Media.Core 334 sub-namespace and the System.Windows.Media.Types 336 sub-namespace.

Classes

AsfProfile Describes the configuration of a file that uses the Advanced Systems Format (ASF) file structure.

AsfProfileMutualExclusion Describes streams that are mutually exclusive.

AsfProfileMutualExclusionCollection Describes a collection of AsfProfileMutualExlusion Objects.

AsfProfileSharedStreamBandwidth Describes a set of steams that, when combine, are warranted not to exceed a specified bandwidth.

AsfProfileSharedSreamBandwidthCollection Describes a collection of AsfProfileSharedStreamBandwidth objects.

AttributeValuePair Represents an extensible attribute for media sample.

BlackBoxPlaybackControl Plays media for which the application cannot explicitly set the destination. Not recommended for use at this time.

Capabilities Provides information about the media engine methods that are supported for the current media source.

CapabilitiesChangedEventArgs Contains information about a MediaEngine.CapabilitiesChanged event.

Capture Provides a mechanism for capturing data from an input device such as a camera or microphone.

ContentEnabler Handles license acquisition and Windows Media Player Individualization for DRM-protected content.

ContentEnableEventArgs Holds information regarding an asynchronous license acquisition or individualization attempt. It is returned by the callback function for the attempt, in the AccessDenied, Individualization, LicenseAcquisition, and MonitorLicenseAcquisition events.

CredentialManager Handles user credentials for password-based authentication schemes such as basic, digest MTLM, and Kerberos authentication.

Destination Represents the output of a presentation.

DestinationCollection Provides a container for Destination Objects.

ExternalDevice This class represents external devices such as webcams, digital video (DV) cameras or VCRs. It provides basic control capabilities. If the device has a tape transport mechanism, you must use the ExternalTransport class to control those functions (rewind, fast forward, preroll, and so on). Some devices might not support all the methods of this class.

Use this class to capture data from, or send data to, and external device.

ExternalTransport Represent the transport controls (the physical tape transport mechanism) on an external device such as a VCR or DV camera. Because this class represent a physical mechanism, certain actions may take a significant amount of time to complete.

Use this class to perform actions such as fast forward, rewind, and preroll on the device, determine whether the transport contains media; and perform other transport-related functions. The implementation of this class can vary, depending on the device.

To control an external VCR, certain hardware requirements are recommended. VCRs with an RS-422 serial interface require a special serial port card or an external RS-232-to-RS-422 adapter. In addition, for best performance, you computer should have a serial port card built with a 16550 high-performance UART to sustain higher baud rates, such as 38.4 baud.

FanOutDestination Enables sharing the media stream with several network destinations for a broadcast presentation.

FrameCacher

IndividualizationStatus Describes the status of an individualization attempt. This class is returned as an argument to he ContentEnabler. Individualization event.

LicenseData Holds data from a DRM version 7 header that is required to obtain a license for content, and the results of a license request.

MediaBuffer Represents a block of memory that contains media data.

MediaClip Provides high-level access to simple editing functions such as trimming a file or combining two files.

MediaClipStream A MediaClipStreamobject represents a single media stream within a file. A steam is composed of a related series of samples, all of the same media type. For example, a file might have an audio stream and a video steam, or just a single stream, or multiple audio steams. Retrieve the MediaClipSteam objects from a MediaClip by using the MediaClipStreamCollection object.

MediaClipStreamCollection Represents a collection of MediaClipStream objects.

MediaEngine Provides a simple API for playing and transcoding media.

MediaEventArgs Contains information about an event generated by an asynchronous process.

mediaFormatConverter Converts a file from one encoding format to another.

MediaFormatConverter Converts a file from one encoding format to another.

MediaFoundationException Contains information about an exception that has been raised in the execution of code specific to the media services API.

MediaGetServiceResoltuionAttribute Creates custom attribute for a class that implements a service.

MedaSample Represents a multimedia sample for a multimedia stream type. An example of a common sample is a video frame. A notable exception is audio where the class typically represents a collection of audio samples instead of a single sample.

A sample may comprise multiple buffers, as is the case of recompressed audio, or it may comprise video received from the network or being sent to an ASF media sink or ASF multiplexer.

An application can use the methods and properties in this class to attache attributes that specify extra information about the sample. Examples of these attributes are sample time, duration, and read/write properties.

MediaServerDestination Connects to a broadcast publishing point on a Windows Media server to enable push distribution.

MediaSink Represents a device that handles the final output of a media stream. For example, a media sink might represent a file writer or an audio renderer.

MediaSource Represents a source of data, such as a device or file.

MediaTransform Represents a transform, which takes input data, modifies or processes it in some way, and generates output data.

Media TransformDesciptor Describes a media transform, which has been implemented in unmanaged code as a DirectX Media Object (DMO).

MediaTransformDescriptorCollection Represents a collection of MediaTransformDescriptor objects.

NetListener Listens to a particular HTTP or RTSP port for client requests and forward the request to other components.

PresentationClock Applications use the presentation clock to start, stop, pause, and rate the components that synchronize a multimedia presentation.

PresentationDescriptor Encapsulates information about a related set of media streams.

PresentationTimer Represents a presentation timer.

PropertyKeys Represents Property keys for metadata.

PublishBroadcastMeda Streams content to connected clients through a URL.

PublishBroadcastMediaToServer Pushes content to a broadcast publishing point on a Windows Media Server.

RateControl Used to control the playback rate.

SampleProperties Represents the core attributes of a media sample. An object of this class can be obtained from the MediaSample.CoreAttributes property.

Sound Represents a sound, which can be played synchronously or asynchronously.

SourceResolver Creates a MediaSource from a URL or byte stream.

StateChangedEventArgs Exposes properties that an application uses to determine the state of the media engine.

StatisticEntryUInt32 Provides access to unsigned 32-bit network statistic entry.

StatisticEntryUInt64 Provides access to an unsigned 64-bit network statistic entry.

StatisticUInt32Collection Represents a collection of StatisticEntryUInt32 objects.

StatisticUInt64Collection Represents a collection of StatisticEntryUInt64 objects.

SteamConfiguration Contains information about the configuration of a data stream. For example, an ASF file can contain multiple audio and video streams, and you can use the StreamConfiguration object to retrieve information about each stream. Unlike a StreamDescriptor object, a StreamConfiguration object applies only to ASF file.

StreamconfigurationColleciton A collection of stream configuration objects describing the various streams in a presentation.

StreamDescriptor Encapsulates information about a single stream in a media presentation.

StreamDescriptorCollection Represents a collection of stream descriptors describing the streams in a media source.

StreamSink Represents the final output of a media stream.

TimerEventArgs Contains information about a timer event.

TranscodingEstimator Estimates the time that will be required to transcode a file, and the size of the output file.

VideoControl Represents a control on a video renderer.

VirtualRoot Enables NetListener to retrieve essential components necessary to stream content to clients.

VolumeControl Controls the audio volume on a media sink or on the media engine.

Interfaces
  IAudioMuteControl Mutes the media engine.
  IAudioVolumeChannelControl Specifies and retrieves the volume on individual channels of the audio rendering device.
  IAudioVolumeControl Controls the volume on an audio rendering device.
  IByteSinkCallback Implemented by a custom media sink.
  IContentProtectionManager Manages the acquisition of licenses for DRM-protected content.
  IMangedMediaSink Implemented by custom sinks.
  IMangedStreamSink Implemented by custom sinks.

Enumerations
  ArchiveType Specifies the file type for Destination constructors that create file destinations.
  EstimatorOutputFileTypes Specifies the file type for a transcoding estimator.
  HttpStatus Specifies the status of the HTTP connection in an individualization attempt. To get the status of the actual individualization, check the StatusFlags enumeration returned by the ContentEnabler.IndividualizationsStatus.Status property
  InternalState Specifies the current state of the media engine.
  Media Event Type Specifies the type of media event that has occurred.
  MediaSinkCharacteristic Specifies the characteristics of a media sink
  NetworkProtocol Specifies the network protocol used by a NetListener object.
  Operation Specifies which underlying unmanaged method the media engine is currently processing.
  State Specifies the current state of a PublishBroadcastMedia Object.
  State Specifies the current state of a PublishBroadcastMediaToServer object.
  StatusFlags Specifies the status of individualization attempt.
  SuspendedState Specifies why the media engine is in a suspended state.
  SystemSoundId Specifies a system-defined sound for Sound.Play and Sound.PlaySound.

Structures
  ASF Contains values used as property keys for an ASF media source.
  AudioVolume Represents the volume on a device or on one channel of a device.
  BandwidthProperties Contains values for the AsfProfile-SharedStreamBandwidth. SharedStreamBandwidthProperties property.
  CD Contains values used as a property keys for a compact disc.
  ContentProtection Contains values used as property keys for content.
  Creation Contains values used as property keys related to content creation.
  Descriptors Contains values used as property keys that describe content.
  Drm Contains values used as property keys related to digital rights management.
  File Contains values used as property keys related to content metadata.
  Identifiers Contains values used as property keys related to identifying content.
  State Provides information about the current state of the media engine.
  Text Contains values used as property keys for a compact disc.
  Urls Contains values used as property keys related to content-related URLs.

Delegates
  ContentEnablerEventHandler Represents the AccessDenied, Individualization, LicenseAcquisition, and MonitorLicenseAquisition events for a ContentEnabler.
  CredentialReguestHandlerCallback Handles a callback function raised to obtain the user's credentials. This is called before each attempt to contact a server.
  GetPresentationDescriptorCallback Represents the method that retrieves a presentationDescriptor.
  MediaEventHandler Delegate type for object that handle media events.
  OnConnectionOpenCallback
  SetDestinationCallback Represents a method that handles the Destination after it is created by the VirtualRoot.
  SourceEventHandler Delegate type for objects that handle media source events.
  TimerEventHandler Delegate type for objects that handle timer events.
  BitmapInformation Contains information about an ImageMediaType.
  HTMLFormat Contains information about an HTMLMediaType.
  SmpteTimeCode Contains information about an SMPTE (society of Motion Picture and Television Engineers) time code.

Design Namespace

A design namespace 320 provides classes that enable the editing of forms and text, formatting data and cross-process data sharing. These classes provide an extensible framework for editing documents, applications, and other content. Design namespace 320 contains functionality on two levels: high-level functionality for application develops desiring prepackaged ready-to-use editors for different types of information; and lower-level functionality for more advanced applications introducing its own types of data. Example prepackaged ready-to-use editors offer plain text editing, rich text editing, forms (element layout) editing, and password input.

Design namespace 320 provides a flexible and extensible approach to organizing various functionality. Instead of providing a common fixed-feature editor, design namespace 320 provides a combination of services, behaviors and abstractions that allow developers to build specialized and easily-customizable information editing solutions. Design namespace 320 includes several customizable editing features, including: scoped services, stackable behaviors, editor-designer pattern, abstract designer for element editing, abstract text object model, adorner layer, design surface, generalized data transfer protocol, and extensible undo mechanism.

Scoped services allows the association of specific services with particular portions and sub-portions of application data. This mechanism also allows turning services on and off in different scopes. The concept of "stackable behaviors" allows different behaviors to be activated in appropriate periods of time. In one embodiment, time-based behavior activation is nested, such that a sub-process can be started and finished while more general process is temporarily suspended and then properly restored. Rather than hard-coding a solution, the approach of stackable behavior solves this problem by allowing an integration of processes that do not have pre-defined knowledge about each other.

The concept of "editor-designer pattern" allows separation between generic editing functionality and more specific sub-typed of editable information. The editor does not expect a specific data structure on which to operate. Instead, it assumes that data content is exposed through some abstract interface, hiding the implementation details, but sufficient for corresponding action of editing interaction. This pattern is particularly useful with elements (in forms editing) and for text (in rich text editing).

"Abstract designer for element editing" is an application of the "editor-designer pattern" for an area of element editing (e.g., forms editing). Various elements may have different internal structures, appearances and behaviors, but if they expose some standard "designers" for movement, rotation, or resizing, then they become editable by the element editor.

The abstract text model is another application of the "editor-designer pattern" for use in rich text editing. This abstraction allows different backing stores to participate in rich text editing, such as RTF, XHTML, plain text, XAML markup, syntactically highlighted source code, etc. Even though the semantic nature and internal structure of these types of texts can be different, by exposing itself via an abstract text model they allow the application of generic editing that text from different backing stores may contain pieces of each other, while providing a seamless editing experience.

The adorner layer is an unified tool that provides rich visual feedback during editing. The adorner layer provides uniformed support for many types of feedback. Powerful visuals may be dynamically attached and detached to elements and other portions of data to indicate potential user activity applicable to them. The design surface is a XAML control that pre-packages editing resources, such as the adorner layer and edit router. This simplifies middle-level editing development.

Editing functions such as cut/copy/paste and drag/drop are important in an integrated information environment, but can be difficult to support due to the complexity and incompatibility of different data types. The generalized data transfer protocol addresses this difficulty by providing for the combination of abstractions used for data extraction, data insertion, data dragging, and data conversion. This generalized data transfer protocol provides a powerful and flexible mechanism for application-data integration.

The extensible undo mechanism manages an undo stack by collecting data of various types. The undo manager includes protocols to handle undo operations with different data types.

The following tables list example members exposed by the System.Windows.Design namespace.

Classes
  ActivationEventFilter EventFilter
  ActivationRectangleAdornerInfo This is the feedback that shows the border on DesignActive elements
  AdornerInfo Provides information about a specific adorner in an odrnerset.
  AdornerLayer Provides a surface for displaying decorations on elements that need to transcend Z-order (the elements always need to be on top).
  CanvasDesigner Default Canvas designer.
  ComponentChangeService Provides undo and redo functionality for design-time actions that affect components.
  Designer Provides a means of editing live content
  DesignerFilterService Defines an optional service that applications and controls can implement to override the default mapping between an element and the designer provided by the DesignerLookupService.
  DesignerLookupService Allows edit behaviors to map elements to designers.
  DesignSurface The recommended root element for editable contact. It aggregates adorners, services, and events.
  EditBehavior Defines the implementation for all edit behaviors.
  Editor Handles user input for a particular selection type, such as text, element, or table. Typically there is a specific editor for each selection type.
  EditorTypeAttribute Associates a selection type with the selection mode. This class cannot be inherited.
  EditRouter Manages the set of currently active EditBehaviors.
  EditRouterchangedEventArgs Arguments for Changed event
  ElementEditor Element editor
  EventFilter Enables event filtering and assignment.
  FrameworkElementDesigner The default Designer for all controls that derive from FrameworkElement.
  MoveBehavior Move Behavior
  ObjectSelection Site Selection
  ParentUndoUnit ParentUndoUnit
  RichTextDesigner ITextDesigner implementation for TextPanel and other controls that support ITextDocumentResult
  RoutedEventAdapter RoutedEventAdapter thunks a specific EventHandler to an RoutedEventHandler so that one handler can handle different types of events. Used by EditRouter
  SelectionRouter SelctionRouter controls mixed selection with multiple selection modes. It derives form EditRouter to route events to modular editors (which derive from Editor).
  SelectionService Provides programmatic access to selection of UI items. You can get feedback on selected items, as well as change selected items and their properties.
  ServiceConverter ServiceConverter—Converter class for converting between a string and an instance of IService.
  SimpleTextDesigner ITextDesigner implementation for Text and other controls that support ITextParagraphResult.
  TextDecorator TextDecorator defines an object that manages text decoration from competing services. Using TextDecorator instead of writing property values privately ensure that competing decoration will never overlap, even in the case of identical priority.

TextEditor Provides text selection services.

TextSelection The TextSelection class encapsulates selection state for the TextEditory class. It has no public constructor, but is exposed via a public property on TextEditor.

UndoService Framework implementation of IUndo Service

UndoStackChagnedEventArgs Provides data for the UndoStackChanged and RedoStackChanged events Interfaces IAddRemoveChildDesigner The IAddREmoveChildDesigner interface is used for adding/removing children IAdornerDesigner Provides access to methods that allow you to retrieve the objects necessary to draw adorners on FrameworkElements.

IDesignActivationContainer The inner element in DesgnActivation that can become designActive. Has the name container as it is assumed that if an element is DesignActive, then it will most likely be editing some child content IDesignActivationContainerParent An IDesignActiavtionContainerarent can be host IDesgnActiavtionContainer's in a Design environment IDesignSurface Interface to be implemented by any element wishing to participate in editing.

IMoveDesigner Move designer interface

IParentUndoUnit IParentUndoUnit interface

IScopedService IScopedService

ISelection Base interface for selection modes

ISelectionDesigner Designer interface associated with the SelctionBehavior (SelectionRouter). A class that implements this would be specified in the Designer Attribute of an element type IService This is a placeholder for a TypeConverter for editing services.

ITextDesigner An interface components implement to supply the TextEditor service with layout-specific information and actions.

IUndoServcie IUndoService interface

IUndoUnit IUndoUnit interface

Enumerations

AdornerInfoZOrder Z-order flags

AdornerRenderTriggers Flags indicating the conditions which cause adorners to rerender EditRouterChange Enumeration of possible router change actions TextDecorationPriority TextDecorationPriority ranks the relative importance of various text markup. It is used to z-order decoration runs in the TextDecorator class.

UndoState Enum for the state of the undo manager

Delegates

UndoStackChangedEventHandler Represents the method that will handle an UndoStackChanged or RedoStackChanged event.

Input Namespace

An input namespace 322 includes an input manager that coordinates inputs received by the system. The input namespace 322 also includes classes that help manage and provide control for different input devices, such as a keyboard or a mouse. The input system allows applications to get information from input devices such as mice, keyboards, and styluses (pens). Most input functionality is in the form of properties, methods and events on the UIElement, FramworkElement, ContentElement, and ContentFrameworkElement classes in the System.Windows namespace. UIElement and ContactElement have similar input functionality, which is captured by the IInputElement interface. Similarly, FrameworkElement and ContentFrameworkElement, which derive from UIElement and ContentElement respectively, share many input APIs and both implement IFrameworkInputElement.

The input system provides full support for keyboards, mouse, and styluses. Keyboard functionality includes keydown/up events, focus management and notification, accessing current key state, and converting keystrokes into input strings. Mouse functionality includes mouse position, clicks, movement, enter/leave events at element boundaries, mouse capture, hover and mouse wheel. Stylus functionality includes position and movement (both when the pen is touching the surface and when it is "in air"), taps/clicks, capture, and gesture recognition.

The Input namespace contains helper classes necessary for the above functionality, such as enumerations, events arguments, delegate signatures, etc. Additionally, the Input namespace includes the Keyboard, Mouse, and Stylus classes, which provide information related to the current state of those devices. The input system provides ways of specifying mouse cursors on a particular element, and for an entire application.

The input system is integrated with Text Services Framework (TSF), which allows other input software to understand the textual context into which new text is being input. This is used by input method editors (IMEs), which allow users of East Asian languages to turn multiple keystrokes into a single character—the IME software communicates with TSF to identify the best interpretation of the keystrokes based on context and uses TSF to insert the text into the document. Similarly, speech recognition uses TSF to pick the best recognition and insert it into the document.

The input system offers automatic integration with TSF, in the form of TextInput event. The input namespace also offers APIs for describing the textual context, and controlling the conversion from raw keyboard input into textual input. The InputManager class provides filters and monitors, which allow a third party to observer the input stream and crate new input events before the original input events have been fired. The inputManger also provides APIs for new devices to be plugged into the input system, using IInputProvider and InputReport.

The following tables list example member exposed by the System.Windows.Input namespace.

Classes

AccessKeyManager AccessKeyManager object is created on demand and it is one per UIContext. It attached an even handler for PostProcessInpu on InputManager and expose registration and unregistration of access keys. When the access key is pressed in calls OnAccessKey method on the target element.

Cursor Supports default cursor types.

CursorTypeConverter TypeConverter to convert CursorType to/from other types. Currently: string is supported.

FocusChangedEventArgs The FocusChangedEventArgs class contains information about key states.

InputDevice Provides the base class for all input devices.

InputEventArgs The InputEventArgs class represents a type of RoutedEventArgs that are relevant to all input events.

InputLanguageChangedEventArgs The InputLanguageEventArgs class represents a type of RoutedEventArgs that are relevant to events raised to indicate changes.

InputLanguageChanginEventArgs The InputLanguageEventArgs class represents a type of RoutedEventArgs that are relevant to events raised to indicat changes.

InputLanguageEventArgs The InputLanguageEventArgs class represents a type of RoutedEventArgs that are relevant to events raised to indicate changes.

InputLanguageManager The InputLanguageManager class is responsible for managing the input language in Avalon.

InputManager The InputManager class is responsible for coordinating all of the input system in "Avalon".

InputMethod The InputMethod class is a place holder for Cicero API, which are communicating or accessing TIP's properties.

InputMethodStateChangedEventArgs

InputProviderSite The object which input providers use to report input to the input manager.

InputReport The InputReport is an abstract base class for all input that is reported to the InputManager.

InputReportEventArgs Provides data for the event that is raised when InputReport is being processed.

Keyboard The Keyboard class represents the mouse device to the member of a context.

KeyboardDevice The KeyboardDevice class represents the mouse device to the members of a context.

KeyboardEventArgs The KeyboardEventArgs class provides access to the logical pointer device for all derived event args.

KeyEventArgs The KeyEventArgs class contains information about key states

KeyInterop Provides static methods to convert between Win32 VirtualKeys and our Key enum.

Mouse The Mouse class represents the mouse device to the members of a context.

MouseButtonEventArgs The MouseButtonEventArgs describes the state of a Mouse button.

MouseDevice The MouseDEvice class represents the mouse device to the members of a context.

MouseDoubleClickEventArgs Provides data for events that are raised when the mouse is doubled-clicked.

MouseEventArgs The MouseEventArgs class provides access the logical Mouse device for all derived event args.

MouseWheelEventArgs The MouseWheelEventArgs describes the state of a Mouse wheel.

NotifyInputEventArgs Provides information about an input event being processed by the input manager.

PreProcessInputEventArgs Allows the handler to cancel the processing of an input event.

ProcessInputEventArgs Provides access to the input manager's staging area.

RawKeyboardInputReport The RawKeyboardInputReport class encapsulates the raw input provided from a keyboard.

StagingAreaInputItem This class encapsulates an input event while it is being processed by the input manager.

TextInputEventArgs The TextInputEventArgs class contains a text representation of input.

TextManager The TextManager class provides the input-to-text event promotion.

TextServicesContext This class manages interop between a UIDispatcher and the Text Services Framework, a native COM API that enables east-asian IME input.

TextStoreInfo This is an internal, link demand protected class.

Interfaces
  IInputLanguageSource An interface for controlling the input language source.
  IInputProvider An interface implemented by all input providers.
  IKeyboardInputProvider An interface for controlling the keyboard input provider.
  IMouseInputProvider An interface for controlling the mouse input provider.

Enumerations
  CursorType An enumeration of the supported cursor types.
  ImeConversionMode ImeConversionMode
  ImeSentenceMode ImeSentenceMode
  InputMethodState State of Ime
  InputMode The mode of input processing when the input was provided.
  InputType The type of input being reported.
  Key An enumeration of all of the possible key values on a keyboard.
  KeyState The KeyState enumeration describes the state that keyboard keys can be in.
  ModifierKeys The ModifierKeys enumeration describes set of common keys used to modify other input operations.
  MouseButton The MouseButton enumeration describes the buttons available on the mouse device.
  MouseButtonState The MouseButtonState enumberation describes the possible states of the buttons available on the Mouse input device.
  RawKeyboardActions The raw actions being reported from the keyboard.
  RawMouseActions The raw actions being reported from the mouse.
  SpeechMode Mode of Speech Structures
  TextServicesMSG Manage version of the Win32 MSG struct.

Delegates
  FocusChangedEventHandler The delegate to use for handlers that receive FocusChangedEventArgs.
  InputEventHandler The delegate to use for handlers that receive InputEventArgs.
  InputLanguageEventHandler This is delegate for InputLanguageChanged and Input LanguageChanging events.
  InputMethodeStateChangedEventHandler The delegate to use for handlers that receive input method state changed event.
  InputReportEventHandler The delegate to use for handlers that receive PointerMoveEventArgs.
  KeyboardEventHandler The delegate to use for handlers that receive KeyboardEventArgs.
  KeyEventHandler The delegate to use for handlers that receive KeyEventArgs.
  MouseButtonEventHandler The delegate to use for handlers that receive MouseButtonEventArgs.
  MouseDoubleClickEventHandler The delegate to use for handlers that receive MouseBoubleClickEventArgs.
  MouseEventHandler The delegate to use for handlers that receive MouseEventArgs.
  MouseWheelEventHandler The delegate to use for handlers that receive MouseWheelEventArgs.

NofityInputEventHandler Delegate type for handles of events that use NotifyInputEventArgs.

PreProcessInputEventHandler Delegate type for handles of events that use PreProcessInputEventArgs.

ProcessInputEventHandler Delegate type for handles of events that use ProcessInputEventArgs.

TextInputEventHandler The delegate to use for handles that receive TextInputEventArgs.

Navigation Namespace

A navigation namespace 324 provides a set of classes and services that allow the building of applications with navigation paradigms, such as a browser application. These classes and services permit the development of applications with customized navigation experiences. For example, when purchasing a product or service from an online merchant, clicking a "Back" button causes the application to display a different page that asks the user if they want to cancel or change their order. In another example, activating a "Refresh" button causes an application to retrieve new data instead of first reloading the application followed by retrieving the new data. The navigation namespace 324 also includes page functions that provide a mechanism for generating a hierarchy of questions that are the presented to a user.

The following tables list example members exposed by the System.Windows.Navigation namespace.

Classes

BoolWrapper A wrapper for a Boolean value.

BoolWrapperPageFunction A typed page function that returns a Boolean value to the previous page.

BoolWrapperReturnEventArgsIntWrapper A wrapper for a Int32 value.

IntWrapperPageFunction A typed page function that returns a Int32 value to the previous page.

IntWrapperReturnEventArgsJournal Contains an application's navigation history.

Journal Entry Represents a journal entry.

LoaderService Used to set the current loader in a given appdomain.

NavigateEventArgs Obsolete.

NavigatingCancelEventArgs Event arguments for the NavigationApplication.Navigating and NavigationWindow.Navigating events.

NavigatingNewWindowCancelEventArgs Event args for the NavigatingNewWindow cancelable event The NavigatingNewWindowCancelEventArgs specifies the target NavigationContainer where the navigation will take place with the Uri or element passed in. By default the Cancel property is set to false. Setting Cancel to true will prevent the new window from being opened, and the navigation will not take place.

NavigationApplication Represents a "Longhorn" navigation application to the system.

NavigationContainer A navigable region that can contain an "Avalon" markup tree. Mormally, this class is not used directly but can be used as the parent class for a custom implementation.

NavigationErorCancelEventArgs Contains the arguments for the NavigatioApplication.NavigationError and NavigationWindow.NavigationError events.

NavigationEventArgs Event arguments for the non-cancellable navigation events, including LoadCompleted, LoadStarted, Navigated, and NavigationStopped.

NavigationProgressEventArgs Contains the arguments for the NavigationApplication.Navigationprocess and NavigationWindow.NavigationProcess events.

NavigationService Contains the delegates used by navigation events, and a dynamic property that contains an INavigator interface.

NavigationWindow Represents a navigation window.

ObjectPageFunction A typed page function that returns an Object value to the previous page.

ObjectReturnEventArgs

PageFunction This class is not directly supported. Instead use one of the typed classes: BoolWrapperPageFunction, IntWrapperPageFunction, ObjectPageFunction, or StringPageFunction.

ReturnArgs The event argument object for the Return event. This class is not directly supported. Instead use the return arguments for the appropriate typed class: BoolWrapperReturnEventArgs, IntWrapperReturnEventArgs. ObjectReturnEventArgs, or StringReturnEventArgs.

StringPageEventArgs A typed page function that returns a String value to the previous page.

StringReturnEventArgs

WindownNavigationContainer Represents a navigable region within a navigation window.

Interfaces

IJournalData IJournalData interface—Should to be implemented by Controls that need to persist state in the journal, and restore it when the page is revisited.

ILoader Interface used to resolve Uri's to streams. It can be used to load content from file, http, container and managed and unmanaged resources.

INavigator Implemented by navigation containers to provide access to the properties, methods, and events that support navigation.

INavigatorService INavigatorService interface. This interface will be available on the NavigationWindow anabling any implementor of INavigator to register themselves to participate in Hyperlink targetting.

Enumerations

NavigationMode Used to specify the navigation mode.

Delegates

BoolWrapperReturn-EventHandlerIntWrapperReturnEventHandler

LoadCompletedEventHandler Represents the method that handles the NavigationApplication.LoadCompleted and NavigationWindow.LoadCompleted events.

LoadStartedEventHandler Represents the method that handles the LoadStarted event.

NavigatedEventHandler Represents the method that handles the NavigationApplication.Navigated and NavigationWindow.Navigated events.

NavigateEventHandler Obsolete

NavigatingCancelEventhandler Represents the method that handles the NavigationApplication.Navigating and NavigationWindow.Navigating events.

NavigatingNewWindowCancelEventHandler Represents the method that handles the NavigatingNewWindow event.

NavigationErrorCancelEventHandler This delegate is used with the NavigationApplication.NavigationError and NavigationWindow.NavigationError events.

NavigationProgressEventHandler This delegate is used with the NavigationWindow.NavigationProgress and NavigationApplication.NavigationProgress events.

NavigationStoppedEventHandler Represents the method that handles the NavigationApplication.NavigationStopped and Navigationwindow.NavigationStopped events.

ObjectReturnEventHandler

ReturnEventHandler Represents the method that handles the Return event. This class is not directly supported. Instead use the return event handler for the appropriate typed class: BoolWrapperReturnEventHandler, IntWrapperReturnEventHandler, ObjectReturnEventHandler, or StringReturnEventHandler.

StringReturnEventHandler

Automation Namespace

An automation namespace 326 provides a set of classes that support the accessibility and user interface automation.

The following tables list example members exposed by the System.Windows.Automation namespace.

Classes

ApplicationWindowPattern Exposes the behavior and information typically associated with a top-level application window. Clients can use this class to tile or cascade the application's multiple document interface (MDI) children, find its button on the taskbar, and locate well-known sections of its user interface such as toolbars and menus.

AssociatedInformationPattern Exposes semantic and metadata for UI elements that represent other objects.

Automation Contains User Interface (UI) Automation methods for clients (assistive technology or automated test script). These methods are not specific to a particular element.

AutomationEvent Do not sue. This class will be removed in future versions.

AutomationEventArgs Pattern or custom event args class

AutomationFocusChangedEventArgs Focus event args class

AutomationIdentifier Base class for object identity-based identifiers. This class is effectively abstract; only derived classes are instantiated.

AutomationIdentifierProxy Internal class used to deserialize AutomationIdentifiers. Should not be used directly.

AutomationPattern Do not use. This class will be removed in future versions.

AutomationPermission Provides a set of permissions for accessing UI elements. This class cannot be inherited.

Automation PermissionAttribute Provides methods and properties for AutomationPermissionAttribute. This class cannot be inherited.

AutomationProperty Do not use. This class will be removed in future versions.

AutomationPropertyChangedEventArgs PropertyChanged event args class

AutomationTextAttribute Identifier for AutomationText Attributes

AutomationTextPointer Represents the position of a character within text. AutomationTextpointer provides methods and properties for accessing text and text navigation.

AutomationTextRange Used to get, set, add and remove selection.

AutomationTextSelection Purpose: The AutomationTextSecection object handles all text selection management. The selection that the insertion pointer is on is the active selection. Example usages: It is used when clients want to add, remove, modify or set selection. Clients can also find out what is currently selected through AutomationTextSelection.

AutomationTextUnit Identifier for AutomationTextUnits

BasePattern Internal Class

DockPattern Expose an element's ability to change its dock state at run time.

ElementNotEnabledException This exception is thrown when client code attempts to manipulate an element or control that is currently not enabled.

ElementPath ElementPath provides criteria necessary to subsequently return to the logical element previously recorded, modified, or wholly created by the application provider.

ExpandCollapsePattern Exposes a control's ability to expand to display more content or to collapse to hide content. Examples include menu buttons, Start button, tree-view item in Windows Explorer, and combo boxes.

GridItemPattern Exposes the elements of a grid. Allows clients to quickly determine the coordinates of a grid item.

HierarchyItemPattern Exposes the hierarchical relationship between a control's user interface elements independent of their relationship in the logical tree.

Input Provides methods for sending mouse and keyboard input

InvokePattern Implemented by objects (controls) that perform a single, unambiguous action. Most of these controls do not maintain state; invoking them initiates an action in the application. Examples of controls that implement this interface include push buttons, toolbar buttons, menu items, hyperlinks, check boxes, radio buttons, the plus symbol in the tree-view control, and listview items in Windows Explorer.

LogicalElement Represents a UI element in the logical tree regardless of implementation ("Avalon", Microsoft® Win32®).

LogicalStructureChangedEventArgs Logical structure changed event args class.

MultipleViewPattern Exposes an elements's ability to switch between multiple representations of the same set of information, data, or children. Examples include ListView (Thumbanils, Tiles, Icons, List, Details) Excel charts (Pie, Line, Bar, Cell Value with a formula), and Outlook Calendar (Year, Month, Week, Day).

NoClickablePointException The exception that is thrown when the value of an argument is outside of the allowable range of values, as defined by GetClickablePoint. For example, when the bounding rectangle is empty, has no width or height or the LogicalElement at that point is not the same one that was called.

ProxyAssemblyNotLoadedException This exception is thrown when there is a problem loading a proxy assembly. This can happen In response to Automation.RegisterproxyAssembly o when loading the default proxies when the first hwnd base LogicalElement is encountered.

RangeValuePattern Exposes a control's ability to manage a value within a finite range. It conveys a control's valid minimum and maximum values and current value.

RawElement Represents an element in the raw element tree.

ScrollPattern Represents UI elements that are expressing a value

SelectionItemPattern Represents individual items in containers that manage selection. UI Automation clients use this class to get information about, or to manipulate, UI elements that support the SelectionItemPattern control pattern, such as an item in a list box or tree view.

SelectionPattern Represents containers that manage selection. Used by UI Automation clients to get information about, or to manipulate, user interface elements that support the SelectionPattern control pattern.

SortPattern Exposes a container's current sort order and allows clients to programmatically re-sort elements.

SplitPattern Represents windows that can clone themselves by creating an adjacent window.

TableItemPattern Represents grid items with header information.

TablePattern Represents a grid that has header information.

TextPattern Represents text, such as an edit control.

TopLevelWindowEventArgs TopLevelWindowEventArgs event args class

ValuePattern Exposes values for controls that do not span a range such as radio buttons, toggle buttons, check boxes, edit boxes, RGB color values, and checkable menu items.

VisualInformationPattern Exposes information about an image or an animation that conveys information to the user such as Internet Explorer's waving flag or spinning globe that indicates a document in downloading or windows Explorer's flying papers that indicate copying is in progress.

WindowPattern Exposes an element's ability to change its on-screen position or size. Examples include top-level application windows (Word or Windows Explorer), Outlook's main window panes (folder, e-mail messages, tasks), and MDI child windows.

ZoomPattern Exposes the current zoom level in a control and allows clients to change it programmatically.

Enumerations

AutomationPermissionFlag Contains the access flags for an Automationpermission object.

ChildArrangement Different ways children may be arranged

DockPosition The edge of the container that the dockable window will cling to.

ExpandCollapseState Used by Expandcollapse pattern to indicate expanded/collapsed state GetDataOptions Options for GetData HierarchyItemState Enumeration that indicates the state of a hierarchy item: collapsed, expanded, or partially expanded ItemCheckState Enumeration that indicates state of checkbox, radio buttons, and similar controls LoadState Tree state flags.

LogicalMapping Values that indicate whether a node in the raw tree will be displayed in the logical tree ProxyFlags Enum used to indicate results of requesting a property RowOrColumnMajor Is the data data in this table best present by row or column ScopeFlags Flags used to define scope when listening to events ScrollAmount Used by ScrollPattern to indicate direction (forward or backward) and amount (page or line) by which to scroll SendMouseInputFlags Flags for SendMouseInput. These flags indicate whether movementnt took place, or whether buttons were pressed released.

SplitStyles Flag for the directions into which a window may split

StructureChangeType Flads that indicate changes in the structure of the logical tree.

TextPointerGravity Gravity determines the placement of a AutomationTextPointer when text is inserted at the AutomationTextPointer. Gravity is always from the text pointer point of view, i.e. I am before my character or I am after my character. When the user inserts a character at your text pointer will be placed before the new character; After means that the pointer will be placed After the new character.

WindowChangeType Flags that indicate changes in top-level window.

WindowInteractionState The current state of the window for user interaction

WindowVisualState States used to describe the visual state of the window. WindowVisualState follows the Office and HTML definition of WindowState.

Structures

MatchCondition Specifies criteria for finding elements using FindLogicalElement or FindRawElement.

NameandData Contains name, data as an object, and data as a string

ProxyDescription Structure containing information about a proxy

SortInformation Information used to sort

Delegates

AutomationEventHandler Delegate to handle Automation-Events

AutomationFocusChangedEventHandler Delegate to handle focus change events

AutomationPropertyChangedEvenHandler Delegate to handle logical structure change events LogicalStructureChangedEventHandler Delegate to handle logical structure events ProxyFactoryCallback Implemented by HWND handler; called by UI Automation framework to request a proxy for specified window. Should return a proxy if supported, or null if not supported.

TopLevelWindowEventHandler Delegate to handle top level window events

The following tables list example member exposed by the System.Windows.Automation.InteropProvider namespace.

Classes

AutomationInteropProvider Contains methods used by Win32 applications or controls that implement User Interface (UI) Automation. This class cannot be inherited.

TextPointerPair Represent a contiguous block of characters

Interfaces

IApplicationWindowInteropProvider Expeses the behavior and information typically associated with a top-level application window.

IAssociatedInformationInteropProvider Exposes semantic and metadata for UI elements that represent other objects.

IDockInteropProvider Expose an element's ability to change its dock state at run time.

IExpandCollapseInteropProvider Exposes a control's ability to expand to display more content or collapse to hide content. Supported in conjunction with the Hierarchy-Item pattern on TreeView items to provide tree-like behavior, but is also relevant for individual controls that open and close. Examples of UI that implements this includes:—TreeView items—Office's smart menus that have been collapsed—Chevrons on toolbars—Combo box—Menus—"Expandos" in the task pane of Windows Explorer (left-hand side where folder view is often displayed).

IGridInteropProvider Exposes basic grid functionality: size and moving to specified cells.

IGridItemInteropProvider Represents an item that is within a grid. Has no methods, only properties.

IHierarchyItemInteropProvider Expose and allow clients to traverse the hierarchical relationship in the logical tree. Hierarchy relationships are by definition noncircular. Examples of UI that implements this includes:—TreeView items—Visio Org Chart—Menus—Listview controls when "Show in groups" mode is active Implemented by objects (controls) that perform a single, unambiguous action. Most of these controls do not maintain state; invoking them initiates an action in the application.

IInvokeInteropProvider Examples of user interface elements that implement this interface include push buttons, toolbar buttons, menu items, hyperlinks, check boxes, radio buttons, the plus symbol in the tree-view control, and list-view items in the Windows Explorer.

IMultipleViewInteropProvider Exposes an element's ability to switch between multiple representations of the same set of information, data, of children This pattern should be implemented on the container which controls the current view of content.

IRangeValueInteropProvider Exposes a related set of properties that reflect a controls ability to manage a value within a finite range. It conveys a controls valid minimum and maximum values and its current value. Examples: Numeric Spinners Progress Bar, IP Control (on the individual octets) some Color Pickers ScrollBars some Sliders public interface that represents UI elements that are expressing a current value and a value range. Public interface has same definition as IValueProvider. The two patterns' difference is that RangeValue has additional properties, and properties generally do not appear in the pattern public interfaces.

IRawElementProviderFragment Implemented by providers to expose elements that are part of a structure more than one level deep. For simple one-level structures which have no children, IRawElementProviderSimple can be used instead. The root node of he fragment must support the IRawElementProviderFragmentRoot interface, which is derived from this, and has some additional methods.

IRawElementProviderFragmentRoot The root element in a fragment of UI must support this interface. Other elements in the same fragment need to support the IRawElementProviderFragment interface.

IRawElementProviderFragmentRootAdviseEvents Implemented on the root element of a UI fragment to allow it to be notified of when it is required to raise automation events.

IRawElementProviderHwndOverride Implemented by providers which want to provide information about or want to reposition contained HWND-based elements.

IRawelementProviderOverrideType Implemented by providers which want to provide information about or want to reposition contained HWND-based elements.

IRawElementProviderSimple UIAutomation provider interface, implemented by providers that want to expose properties for a single element. To expose properties and structure for more than a single element, see the derived IRawElementProviderFragment interface IScrollInteropProvider The Scroll pattern exposes a control's ability to change the portion of its visible region that is visible to the user by scrolling its content. Examples: Listboxes TreeViews other containers that maintain a content area larger than the control's visible region Note that scrollbars themselves should not support the Scrollable pattern; they support the RangeValue pattern. Servers must normalize scrolling (0 to 100). This public interface represents UI elements that scroll their content.

ISelectionInteropProvider Provides access to the properties implemented by non"Longhorn" providers on containers that manage selection.

ISelectionItemInteropProvider Provides access to methods and properties that define and manipulate selected items in a container. Is only supported on logical elements that are children of elements that supports ISelectionInteropProvider and is itself selectable.

ISortInteropProvider Expose a container's current sort order and allow clients to programmatically resort its elements. Some containers maintain the sort order when inserting new items, or move their contents based on updated content (example: sorted Wind32 listboxes). Other containers are only capable of performing a one-time sort that becomes out-of-date when new items are inserted (example: Excel)

ISplitInteropProvider Exposes the ability to split an elements content area into multiple panes or interactive areas.

ITableInteropProvider Identifies a grid that has header information.

ITableItemInteropProvider Used to expose grid items with header information.

ITextInteropProvider The Text pattern exposes a control's ability to manipulate text. Examples: TextBox RichEdit controls other container that contain text and text related properties this interface represents UI elements that maintain text.

ITextPointerInteropProvider The Text pattern exposes a control's ability to manipulate text. Examples: TextBox RichEdit controls other containers that contain text and text related properties this interface represents UI elements that maintain text.

IValueInteropProvider Public interface that represents UI elements that are expressing a value IVisualInformationInteropProvider Used to express information about an image or an animation that is conveying information to the user.

IWindowInteropProvider Expose an element's ability to change its on-screen position of size, as well as change the visual state and close it.

IZoomInteropProvider Exposes the current zoom level in a control and allows clients to programmatically change it.

Enumerations
  Navigatedirection Directions for navigation the UIAutomation tree
  RawElementProviderOverrideType Indicates whether this provider is acting as an override or as a non-client-area provider.
  Serialization Namespace A serialization namespace 328 provides a parser that can load or save a hierarchy of objects (e.g. elements) from or to an XML file or a file with a binary representation. This process also sets properties associated with the objects and associates event handles. Further, serialization namespace 328 provides functionality for serializing and de-serializing objects. Serialization is a process of taking a live, in-memory representation of objects, and producing a stream of data suitable for saving to a storage device (such as a disk) or sending across a network. Deserialization is the reverse process; i.e., taking a data stream and producing objects from the data stream. Deserialization is also referred to as "parsing", and the code that implements parsing is known as the parser.

Both serialization and Deserialization support multiple streaming formats, such as an XML format referred to as XAML or a binary format referred to as BAML. When the parser is used with a markup compiler, if can generate "CAML", where the output is code to generate the serialized objects.

Serialization and deserialization support the full range of XAML features, including: standard syntax, compound properties, compact compound syntax, implicit child syntax, explicit children syntax, collection syntax with explicit collection tag, and collection syntax with implicit collection tag. Both serialization and deserialization are fully extensible. Classes can define how they wish to be serialized and deserialized through several mechanisms, such as:

By default, class names are treated as markup tag names, and properties and events are treated as markup attributes of the same name.

Classes define type converters (auxiliary objects driving from System.ComponentModel.TypeConverter) to serialize and deserialize markup attribute values.

Classes can support implicit children by implementing the IAddChild interface (parsing) and using CLR attributes to describe how to serialize implicit children.

Classes can control whether a property can be serialized/deserialized by using the DesignerSerializationVisibility, and control whether it is necessary to serialize a property on a particular object by using the DefaultValueAttribute and ShouldPersist methods.

Classes define type converters (auxiliary objects driving from System.ComponentModel.Typeconverter) to serialize and deserialized markup attribute values.

Classes can support implicit children by implementing the IAddChild interface (parsing) and using CLR attributes to describe how to serialize implicit children.

Classes can control whether a property can be serialized/deserialized by using the DesignerSerializationVisibility, and control whether it is necessary to serialize a property on a particular object by using the DefaultValueAttribute and ShouldPersist methods.

Or, a component can serialize/deserialized itself using literal content, in which case the component's serialized form does not have to conform to the rules of XAML (the component needs to be well-formed XML).

Although the above examples use the word "markup", the same concepts apply to the binary format (BAML).

A Second extensibility mechanism is "designer hooks", which allows another piece of code to plug into the serializer and deserializer, and insert and intercept attributes during parsing and serialization. This mechanism allows new markup features to be created, and allows custom processing of existing syntax. The markup compiler uses designer hooks to generate CAML.

Serialization and deserialization support a variety of objects (e.g., any class driving from System.Object). Classes driving from System.Windows.DependencyObject can define dependency properties, which get two extra features:

Serialization can automatically tell whether a property needs to be serialized (no need for DefaultValueAttribute/ShouldPersist)

The parser can perform certain optimizations to load faster

Serialization and deserialization support XML namespaces and definition files that map XML namespaces to CLR namespaces. The Mapper class allows the definition of arbitrary mappings from XML namespaces and tag names into CLR classes.

The following tables list example members exposes by the System.Windows.Serialization namespace.

Classes

CustomXamlDeserializer The base class for the deserialization helper. This should be subclassed if design or edit time deserialization direction of the parser is required.

CustomXamlSerializer The base class for the serialization helper. This should be subclassed if design or edit time serialization direction of the serializer is required.

DependencyPropertyContext Context information about the current property being serialized. The XamlSerializer is responsible for putting an instance of this class on the context stack before serializing any property on an object.

DPSerializationVisibilityAttribute Specifies the visibility of this property or method as seen by the designer serializer.

EntityContext Abstract base class for ObjectContext and PropertyContext.

LayoutAttribute Attribute for specifying the LayoutType for a tag.

Mapper Handles mapping between Extensible Markup Language (XML) namespace Uniform Resource Identifier (URI) Microsoft® .NET namespace types.

NamespaceMap Contains information the Mapper uses for Mapping between an xml NamespacUri and what Assembly, urtNamespace to look in.

ObjectContext Context information about the current object being serialized. The XamlSerializer is responsible for putting an instance of this class on the context stack in SerializeObject.

Parser "Avalon" Element Parsing class used to Create an "Avalon" Tree.

ParserContext Provides all the context information required by a Parser

PropertyContext Context information about the current property being serialized. The XamlSerializer is responsible for putting an instance of this class on the context stack before serializing any property on an object.

TextContext Context information about the current object being serialized. The XamlSerializer is responsible for putting an instance of this class on the context stack in SerializeObject.

XamlAttributeNode XamlAttributeNode

XamlClrArrayPropertyNode XamlClrArrayPropertyNode

XamlClrComplexPropertyNode XamlClrComplexPropertyNode, which is an object specified as the child of a clr object.

XamlClrEventNode XamlClrEventNode, which is a clr event on any object. Note that this may be on a DependencyObject, or any other object type.

XamlClrObjectNode XamlClrObjectNode, which is anything other than a Dependency Object XamlClrPropertyNode XamlClrObjectNode, which is a clr property on any object. Note that this may be on a DependencyObject, or any other object type.

XamlClrPropertyParseException Exception class for parser property parsing specific exceptions XamlComiplexDependencyPropertyNode XamlComplexDependencyPropertyNode, which is a DependencyProperty specified as the xml child of a DependencyObject XamlComplexPropertySerializer XamlComplexPropertySerializer is used to serialize properties that can not be serialized as XML attributes. ComplexProperties are instead serialized as markup within the element.

XamlDefAttributeNode XamlDefAttributeNode

XamlDefTagNode XamlDefTagNode

XamlDependencyObjectSerializer Extends XamlSerializer to include animations (specific to Elements)

XSamlDependencyPropertyNode XamlDependencyPropertyNode, which is a normal, simple DependencyProperty on a DependencyObject XamlDependencyPropertyParseException Exception class for parser dynamic property parsing specific exceptions XamlDesignerSerializerAttribute Specifies the type name of serializer for the given class.

XamlDocumentNode XamlDocumentNode

XamlElementNode XamlElementNode, which represents a DependencyObject. These are different from CLR objects because they can have Dependency Properties associated with them.

XamlEndAttributesNode XamlEndAttributesNode

XamlEndClrArrayPropertyNode XamlEndClrArrayPropertyNode

XamlEndClrComplexPropertyNode XamlEndClrComplexPropertyNode

XamlEndClrObjectNode XamlEndClrObjectNode

XamlEndComplexDependencyPropertyNode XamlEndComplexDependencyProperty Node

XamlEndDocumentNode XamlEndDocumentNode

XamlEndElementNode XamlEndElementNode

XamlEndDictionaryPropertyNode XamlEndDictionaryPropertyNode

XamlEndListPropertyNode XamlEndListPropertyNode

XamlEndResourceNode XamlEndResourceNode

XamlEndStartElementNode XamlEndStartElementNode

XamlDictionaryPropertyNode XamlDictionaryPropertyNode

XamlIEnumeratorSerializer Serializes the node collection pointed to by the property.

XamlIListPropertyNode XamlIListPropertyNode

XamlIListSerializer Serializes the IList pointed to by the property.

XamlIncludeTagNode XamlIncludeTagNode

XamlLanguageNode XamlLanguageNode

XamlLiteralContentNode XamlLiteralContentNode

XamlNode Base Node in which all others derive

XamlParseException Exception class for parser specific exceptions

XamlPIMappingNode XamlPIMappingNode which maps an xml namespace to a clr namespace and assembly XamlResourceNode XamlResourceNode XamlRootSerializer XamlSerializer is used to persist logical tree XamlRoutedEventNode XamlRoutedEventNode XamlSerializationCallbackException Exception class for serialization callback specific exceptions XamlSerializer XamlSerializer is used to persist the logical tree.

XamlSerializerBase Base class for XamlSerializer providing common helper functions.

XamlTextNode XamlTextNode

XamlTextnodeSerializer Overrides XamlSerializer to special case TextNodes.

XamlXmlnsPropertyNode XamlXmlnsPropertyNode

XmlAttributes A class to encapsulate XML-specific attributes of a DependencyObject XmlnsDictionary A dictionary to control XML namespace mappings XmlParserDefaults Public class used by Avalon.

Interfaces
　IAddChild The IAddChild interface is used for parsing objects that allow objects or text underneath their tags in markup that do not map directly to a property.
　IBamlSerialize Serialization interface for Dynamic Properties written to BAML files
　ILoaded This interface provides a read-only Boolean property call IsLoaded, a clr event handler called Loadeded, and DeferLoad and EndDeferLoad methods
　IPageConnector Provides methods used internally by the BamlReader on compiled content.
　IParseLiteralContent For Literal Content—content which has its own parser and saver.
　IUriContext The IUriContext inferface allows elements (like Frame, PageViewer) and type converters (like ImageData TypeConverters) a way to ensure that base uir is set on them by the parser, codegen for xaml, baml and caml cases. The elements can then use this base uri to navigate.

Enumerations
　LayoutType Layout types that can be associated with an Object.
　SerializationAction Describes the action the serializer or deserializer is to take after it has called back to the CustomXamlSerializer or CustomXamlDeserializer helpers
　SerializationErrorAction Describes the action the serializer or deserializer is to take when an error has been reported
　XamlNodeType Identifier for XamlNodes Interop Namespace An interop namespace 330 provides a set of classes that enable interoperability with other operating systems or computing platforms. The following tables list example members exposed by the System.Window.Interopnamespace.

Classes
　ApplicationProxy MarshalByRefObject wrapper over Application class to allow interaction with Application object across Appdomains and to allow Application creation on a different thread.
　DocobjHost Interop class used for implementing the managed part of a Docobj Server for browser hosting.
　PresentationInteropHelper VisualInteropHelper WindowInteropHelper Implements Avalon WindowInteropHelper classes, which helps interop b/w legacy and Avalon Window.

Delegates
　AppEntryPoint Delegate for the Application code's entry point method.

Forms.Interop Namespace

A forms.interop namespace 332 provides an element that allows an application to host a form control operation.

System.IO.CompoundfileNamespace

Another namespace, System.IO.Compoundfile (not shown in FIG. 3a) provides services to utilize a compound file in which various document distributable files are stored. These services allow for the encryption and compression of content.

The services also support the storage of multiple renditions of the same content, such as a re-flowable document and a fixed-format document. The following tables list example members exposed by the System.IO.CompoundFile namespace.

Classes
  CertficateHelper Helper to get a digital certificate for signing
  CompoundFilebyteRangeReference Substream reference component that refers to a range of bytes within a compound file stream.
  CompoundFileIndexReference Substream reference component that refers to a range of bytes within a compound file stream.
  CompoundFileReference A reference to a portion of a compound file.
  CompoundFileReferenceCollection A read-only collection of compound file references.
  CompoundFileStreamReference Logical reference to a container storage
  CompoundFileStreamReference Logical reference to a container stream
  CompressionTransform CompressionTransform for use in Compound File DataSpaces
  ContainerHelper This class enables users to get access to the StorageRoot of the current container based on the loaded Application instance
  DataSpaceManager Used to manipulate the data spaces within a specific instance of the "Avalon" container. This is how data transform modules are plugged into the container to enable features like data compression and data encryption.
  DigitalSignature Read-only class that enables clients to inspect and validate existing digital signatures.
  DigitalSignatureCollection A read-only collection of digital signatures.
  DigitalSignatureManager This class is used to create, persist, and manipulate digital signatures in a compound file.
  DocumentSummaryInfo Contains property elements corresponding to the properties in the standard OLE document summary information property set.
  FormatVersion Class for manipulating version object
  InstanceDataFormatException The exception that is thrown when the format of the DrmTransformInstanceData on disk is invalid.
  OlePropertyPropSet
  RenditionInfo Class for manipulating information of a rendition. This class also provides APIs for adding and removing storages and streams to and from the rendition.
  RenditionInfoCollection A strongly typed collection of RenditionInfo objects
  RenditionManager Class for manipulating renditions in a container
  RightsManagementEncryptionTransform Class implements IDataTRansform interface, so it can be used as a Container data transform that implements RM encryption and decryption of the content
  StorageInfo Class for manipulating storages in the container file
  StorageRoot Represents the main container class. There is one instance of the StorageRoot per compound file.
  StreamInfo Provides access for manipulating streams in the container file.
  SummaryInfo
  TransfromEnvironment An instance of this class is given to each transform object as a means for the transform object to interact with the environment provided by the data space manager. It is not mandatory for a transform object to keep a reference on the given TransformEnvironment object as it might choose to discard it if there is no need to interact with the transform environment.
  TransforminitializationEventArgs Public class for passing arguments into event handlers
  UseLicenseInfo Contains information describing a use license returned from the Tungsten server.
  UseLicenseInfoEnumerator Represents an enumerator over the use licenses stored in the DRM Transform's instance data.
  VersionTuple Class for a version tuple which consists of major and minor numbers
  XmldigitalSignatureProcessor Signature processor used by the digital signature manager to sign and validate data according to the W3C recommendation.

Interfaces
  IDataTransform Interface to be implemented by all data transform objects
  ILicenseStorage This interface is used to decouple RMTransform and RMWizard by building custom implementation of this interface we enable $3^{rd}$ parties to take advantage of the RMWizard without forcing them to use RMTransform
  ISignatureProcessor Signature processor interface
  IUnknownRCW This interface is used to opaquely handle any COM interface (wrapped in the Runtime COM Wrapper) as an IUknown.

Enumerations
  DigitalSignatureProcessor Predefined Digital Signature Processors
  SignatureProcessorNameType Type of signature Processor
  TransformIdentifierTypes When naming a transform object, the string being passed in can be interpreted in one of several ways. This enumerated type is used to specify the semantics of the identification string.

Delegates
  InvalidSignatureHandler Called with signatures that failed hash verification
  TransformInitializeEventHandler Delegate method for initializing transforms Application Model A Windows Client Platform Application Model integrates characteristics of the Web with characteristics of traditional desktop applications. The application Model provides a framework for secure applications and simplifies development, deployment and maintenance of client applications. This framework provides a simple and consistent user experience. For example, local applications can leverage familiar browser-like features regardless of whether the application is hosted in the browser or is a standalone application, while retaining the benefits of executing on the local client. This framework allows users to leverage their familiarity with the Web, thereby increasing the user's comfort level and reducing the time required to learn to use a new application. The Application Model is part of the System.Windows namespace.

Applications utilizing the Application Model operate in a manner similar to Web pages. When a user browses to an application, the application is automatically installed without requiring user confirmation of the installation, rebooting the client system, or risking the malfunctioning of other applications. In one embodiment, applications download progressively, thereby providing an initial level of interactivity before the application updates are handles automatically and in a manner that is transparent to the user. Thus, the user always has access to the latest version of the application without having to explicitly perform and application upgrade.

Applications that use the Application Model run locally on the client system regardless of whether the client system is on-line (i.e., actively coupled to the Web) or off-line (i.e., not actively coupled to the Web). This allows an application to provide better performance than a server-based application that needs an active Web connection and continually exchanges data with the server across the Web. After an application is installed on a client system, the application can be accessed from a "Start" menu (like a traditional desktop application) or by navigating to the application (like a Web application). The Application Model contains three primary parts: application lifecycle management, and application framework and a navigation framework.

Two different types of applications arte supported the Application Model: an "on-line application" and a "managed application". Applications utilizing the application Model can execute in the browser or in a standalone top-level window. An "on-line application" is an application that executed from a server and is hosted in a browser. The application can be cached for offline access or the application may require certain on-line resources to execute property. A "managed application" is available off-line and is installed on the client. The operating system services the managed application. An entry for the managed application can be added to the "Start" menu on the client. Applications can be downloaded progressively to allow the user to begin interacting with the application as it is being downloaded rather than delaying interaction until an installation process has finished.

Applications have an associated application manifest that describes the application's dependencies, such as additional libraries and resources needed to execute the application. An installer uses the application. A "trust manager" is invoked as part of the installation process. The trust manager uses the application manifest to determine what permissions are needed for the application to execute. The application manifest also specifies shell information, such as file associations and whether to add an entry to the Start menu as well as the icon and text for the entry.

Applications utilizing the Application Model include markup, code, resources and a manifest. An application is defined and scoped by its application object, which is a global object that persists in memory for the lifetime of each application session. The application object has knowledge of all the resources that belong to the application and provides a boundary between itself and other applications or external resources. The application framework used the application object to identify, reference and communicate with the application. The application object is also used within the application to manage windows and resources, specify startup and shutdown behavior, handle configuration settings, specify visual styles for the application, share code, state and resources across navigations, and handle application-wide events.

A navigation framework supports navigation-based applications that leverage user' familiarity with the navigation and journaling activities on the Web to provide a more familiar, consistent user experience on the client system, regardless of whether the application is hosted in the system browser or in a standalone top level window. Journaling is the process used by the navigation framework to track navigation history. The journal allows users to retrace their stops backward and forward in a linear navigation sequence. Whether a navigation experience is hosted in the browser or in a standalone navigation window, each navigation is persisted in the journal and can be revisited in a linear sequence by using "forward" and "back" buttons of by invoking "go forward" and "go back" methods. Each navigation window has an associated journal.

A NavigationApplication class simplifies the task of creating navigation-based applications by providing properties and events related to navigation. The NavigationApplication class includes a startup property that specifies the page or element to which the system navigates when the application is first launched. This class also has a properties collection that allows an application developer to share global state information across pages without having to subclass he application, and supports data binding to these properties.

Exemplary Computing System and Environment

Figure 4:
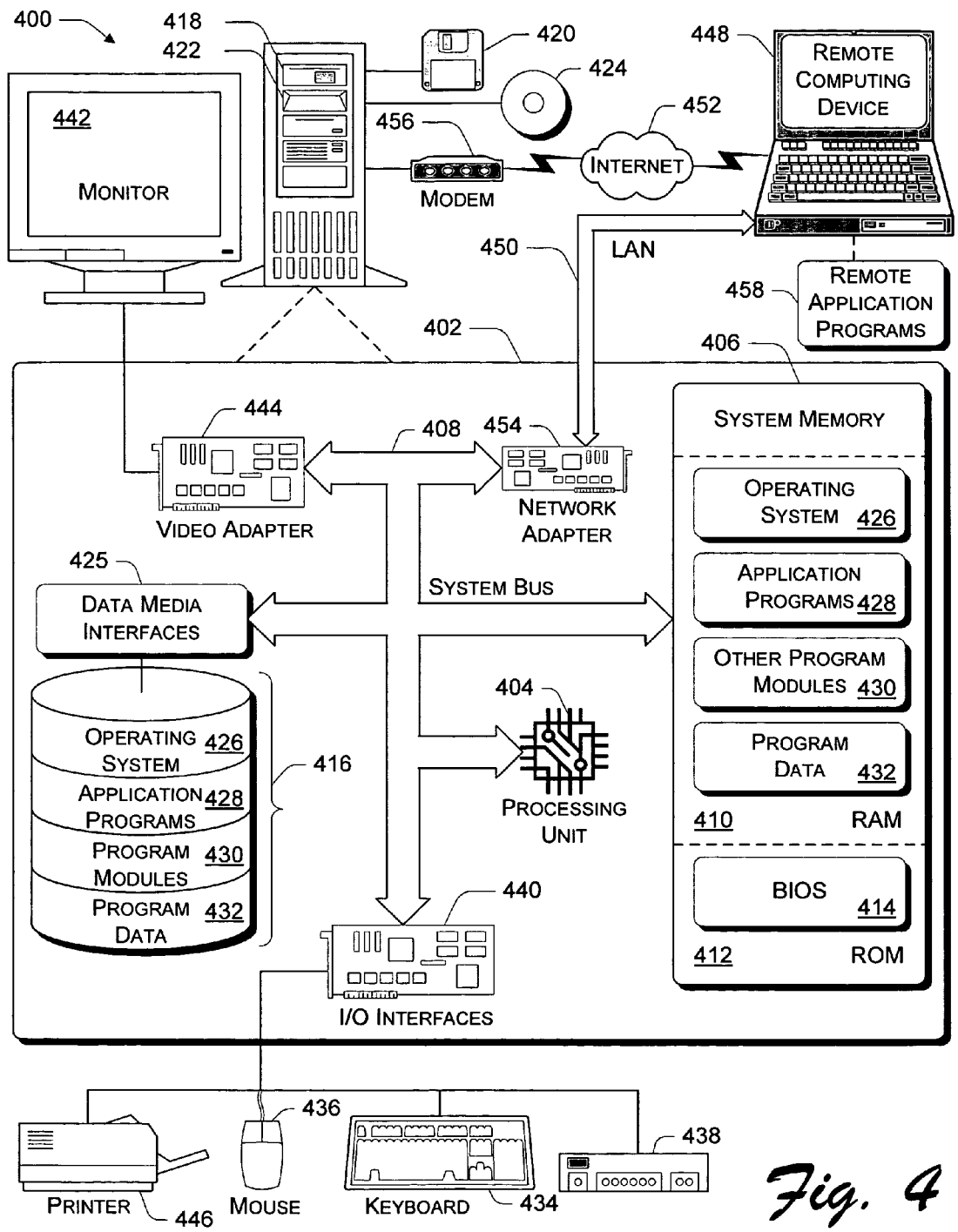
FIG. 4 is a block diagram of an exemplary computer that may execute all or part of the software architecture.

FIG. 4 illustrates an example of a suitable computing environment 400 within which the programming framework 132 may be implemented (either fully or partially). The computing environment 400 may be utilized in the computer and network architectures described herein.

The exemplary computing environment 400 is the only one example of a computing environment and is not intended to suggest any limitation as to the scope of use of functionality of the computer and network architectures. Neither should the computing environment 400 be interpreted as having any dependency or requirement relating to any one or combination of components illustrated in the exemplary computing environment 400.

The framework 132 may be implemented with numerous other general purpose or special purpose computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devises, and so on. Compact or subset versions of the framework may also be implemented in clients of limited resources, such as cellular phones, personal digital assistants, handheld computers, or other communication/computing devices.

The framework 132 may be described in the general context of computer-executable instructions, such as program modules, being executed by one or more computers or other devices. Generally, program modules include routines, programs, objects, components, data structures, etc. that perform particular tasks or implement particular abstract data types. The framework 132 may also be practiced in distributed computing environments where tasks are performed by remote processing devices that a linked though a communications network. In a distributed computing environment, program modules may be located in both local and remote computer storage media including memory storage devices.

The computing environment 400 includes a general-purpose computing device in the form of a computer 402. The components of computer 402 can include, but are not limited to, one or more processors or processing units 404, a system memory 406, and a system bus 408 that couples various system components including the processor 404 to the system memory 406.

The system bus 408 represents one or more of several possible types of bus structures, including a memory bus or memory controller, a peripheral bus, and accelerated graphics port, and a processor or local bus using any of a variety of bus architectures. By way of example, such architectures can include an Industry Standard Architecture (ISA) bus, a Micro channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements with computer 402, such as a during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 4 illustrates a hard disk drive 416 for reading from and writing to a non-removable, non-volatile magnetic media (not shown), a magnetic disk drive 418 for reading from and writing to a removable, non-volatile magnetic disk 420 (e.g. a "floppy disk"), and an optical disk 424 such as a CD-ROM, DVD-ROM, or other optical media. The hard disk drive 416, magnetic disk drive 418, and optical disk drive 422 are each connected to the system bus 408 by one or more data media interfaces 425. alternatively, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EE-PROM), and the like, can also be utilized to implement the exemplary computing system and environment.

Any number of program modules can be stored on the hard disk 416, magnetic disk 420, optical disk 242, ROM 412, and/or RAM 410, including by way of example, an operating system 426, one or more application programs 428, other program modules 430, and program data 432. Each of the operating system 426, one or more application programs 428, other program modules 430, and program data 432 (or some combination thereof) may include elements of the programming framework 132.

A user can enter commands and information into computer 402 via input devices such as keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and so on. The remote computing device 448 is illustrated a a port able computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks intranets, and the Internet.

When implemented in a LAN networking environment, the computer 402 is connected to a locate network 450 via a network interface od adapter 454. When implemented in a WAN networking environment, the computer 402 typically includes a modem 456 or other means for establishing a communications over the wide network 452. The modem 456, which can be internal or external to computer 402, can be connected to the system bus 408 via the input/output interfaces 440 or other appropriate mechanisms. It is the be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustrations, application programs and other executable program components such as the operating system are illustrated herein as discrete blocks, although it is recognized that such programs and components reside at various times in different storage components of the computing device 402, and are executed by the data processor(s) of the computer.

An implementation of the framework 132, and particularly, the API 142 or calls made to the API 142, may be stored on or transmitted across some form of computer readable media. Computer readable media can be any available media that can be accessed by a computer. By way of example, and not limitation, computer readable media may comprise "computer storage media" and "communications media." "Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information delivery media. The term "modulated data signal" means a signal that has one or more of its characteristics set or changed in such as manner as to encode information in the signal. By way of example, and not limitations, communication media includes wired media such as a wired network or direct-wired connection, and wireless media such as acoustic, RF, infrared, and other wireless media. Combinations of any of the above are also included within the scope of computer readable media.

Alternatively, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

Figure 5:
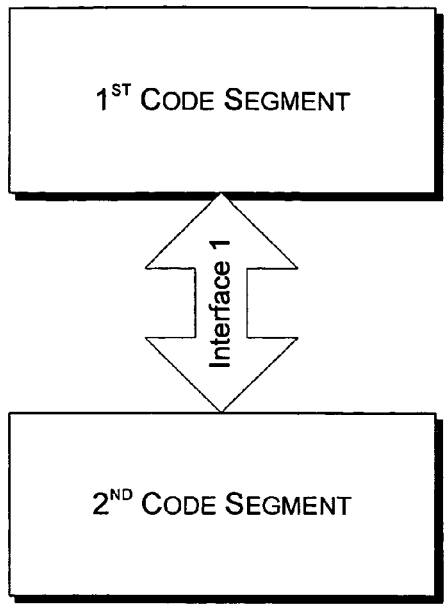
Figure 6:
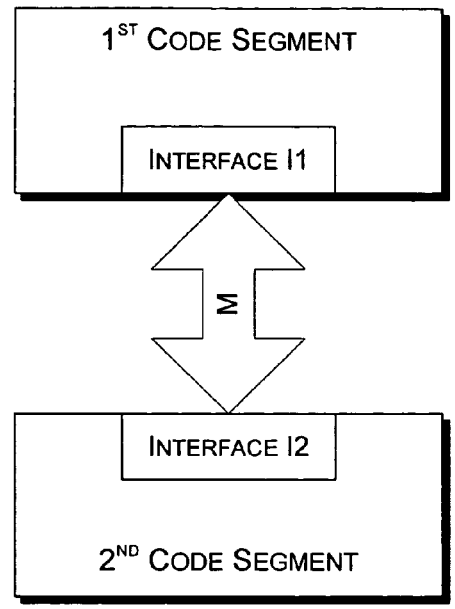

Notionally, a programming interface may be viewed generically, as shown in FIG. 5 or FIG. 6. FIG. 5 illustrates an interface Interface1 as a conduit through which first and second code segments communicate. FIG. 6 illustrates an interface as comprising interface objects I1 and I2 (which may or may not be part of the first and second code segments), which enable first and second code segments of a system to communicate via medium M. In the new of FIG. 6, on may consider interface objects I1 and I2 as separate interfaces of the same system and one may also consider that objects I1 and I2 plus mecum M comprise the interface. Although, FIGS. 5 and 6 show bidirectional flow and interfaces on each side of the flow, certain implementations may only have information flow in one direction (or no information flow as describe below) or may have information flow in one direction (or no information flow as described below) or may only have an interface object on one side. By way of example, and not limitation, terms such as application programming or program interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a send code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the forgoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 5 and 6, but they nonetheless perform a similar function to accomplish the same overall result. We will now briefly describe some illustrative alternative implementations of a programming interface.

A. Factoring

Figure 7:
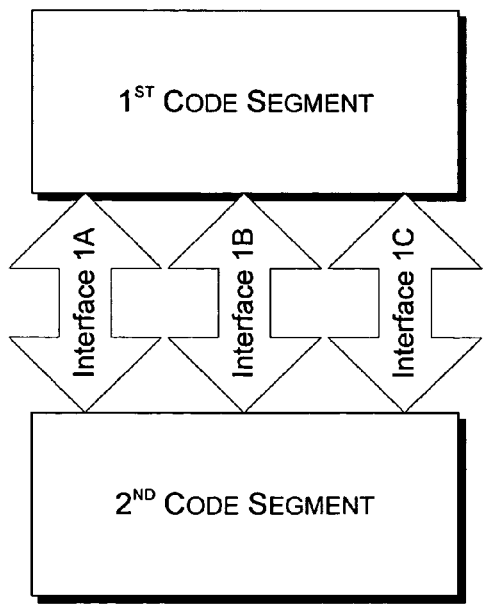
Figure 8:
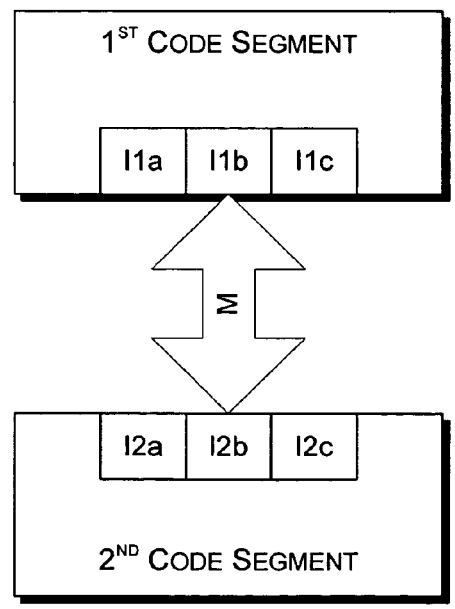

A communication from one code segment ot another may be accomplished indirectly by breaking the communication into multiple discrete communications. This is depicted schematically in FIGS. 7 and 8. As shown, some interfaces can be described in terms of divisible sets of functionality. Thus, the interface functionality of FIGS. 5 and 6 may be factored to achieve the same result, just as one may mathematically provide 24, or 2 times 2 times 3 times 2. Accordingly, as illustrated in FIG. 7, the function provided by interface Interface1 may be subdivided to convert the communications of the interface into multiple interfaces Interface1A, Interface 1B, Interface1C, etc. while achieving the same result. As illustrated in FIG. 8, the function provided by the interface I1 may be subdivided into multiple interfaces I1*a*, I1*b*, I1*c*, etc. while achieving the same result. Similarly, interface I2 of the second code segment which receives information from the first code segment may be factored into multiple interfaces I2*a*, I2*b*, I2*c*, etc. When factoring, the number of interfaces included with the 1st code segment need not match the number of interfaces with the 2nd code segment. In either of the cases of FIGS. 7 and 8, the functional spirit of interfaces Interface! And I1 remain the same as with FIGS. 5 and 6, respectively. The factoring of interfaces may also follow associative, commutative, and other mathematical properties such that the factoring may be difficult to recognize. For instance, ordering of operations may be unimportant, and consequently, a function carried out by a interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 9:
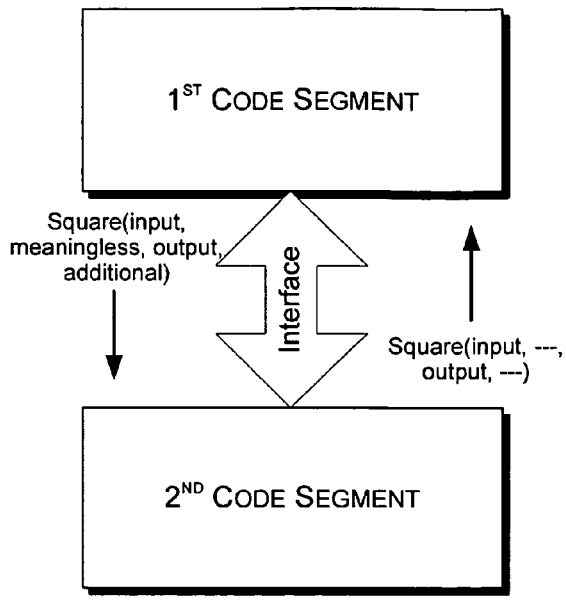
Figure 10:
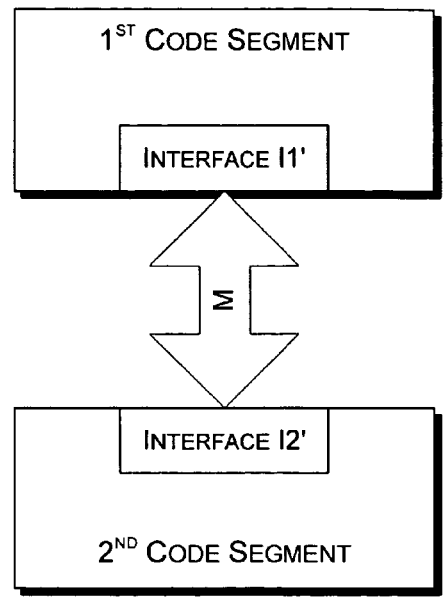

In some cases, it may be possible to ignore, add or redefine certain aspects (e.g. parameters) of a programming interface while still accomplishing the intended result. This is illustrated in FIGS. 9 and 10. for example, assume interface Interface1 of FIG. 5 includes a function call Square(input, precision, output), a call that includes three parameters, input, precision and output, and which is issued from the 1st Code Segment to the 2nd Code Segment. If the middle parameter precision is of no concern in a given scenario, as shown in FIG. 9, it could just as well be ignored or even replaced with a meaningless (in this situation) parameter. Once may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 10, interface I1 is replaced by interface I1', redefined to ignore or add parameters to the interface. Interface I2 may similarly be redefined as interface I2', redefined to ignore unnecessary parameter, or parameters that may be processed elsewhere. The point her is that in some cases a programming interface may include aspects, such as parameters, that are not needed for some purpose, and so they may be ignored or redefined, or processed elsewhere for other purposes.

C. Inline Coding

Figure 11:
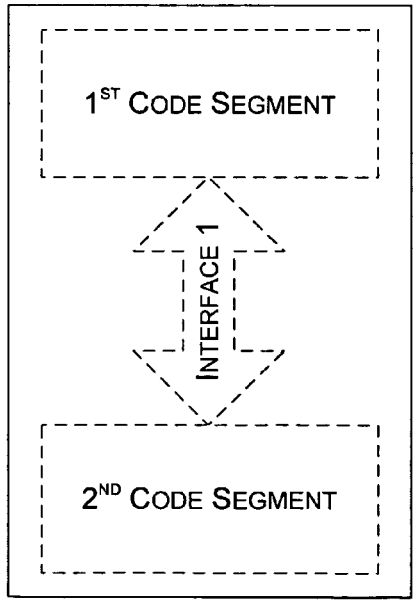
Figure 12:
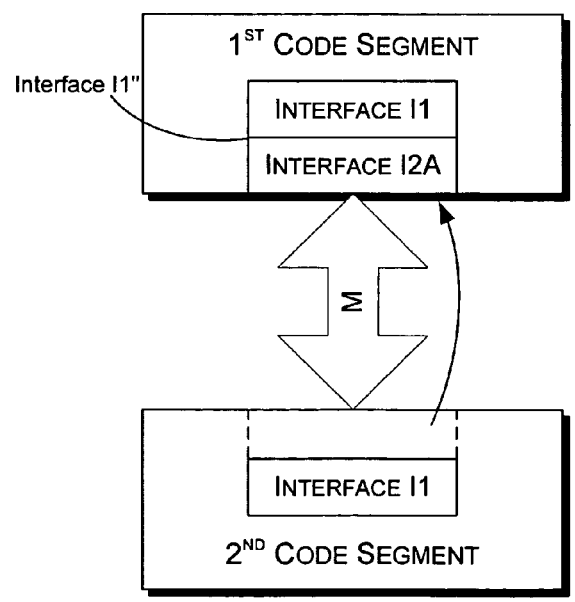

It may also be feasible to merge some or all of the functionality of two separate code modules such that the "interface" between them changes form. For example, the functionality of FIGS. 5 and 6 may be converted to the functionality of FIGS. 112 and 12, respectively. In FIG. 11, the previous 1st and 2nd Code Segments of FIG. 5 are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 12, part (or all) of interface I2 from FIG. 6 may be written inline into interface I1 to form interface I1". As illustrated, interface I2 is divided into I2a and I2b, and interface portion I2a has been coded in-line with interface I1 for form interfaceI1". For a concrete example, consider that the interface I1 from FIG. 6 performs a function call square (input, output), which is received by interface I2, which after processing the value passed with input (to square it) by the second code segment, passes back the squared result the output. In such as case, the processing performed by the second code segment (squaring input) can be performed by the first code segment without a call to the interface.

D. Divorce

A communication from one code segment to another may be accomplished indirectly by breaking the communication into multiple discrete communications. This is depicted schematically in FIGS. 13 and 14. As shown in FIG. 13, one or more pieces(s) of middleware (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, and operating systems is changed to use a different interface, in this case interfaces Interface2A, Interface 2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 14, a third code segment can be introduced with divorce interface DI1 to receive the communications from interface I1 and with the divorce interface DI2 to transmit the interface functionality to, for example interfaces I2a and I2b, redesigned to work with DI2, but to provide the same functional result. Similarly, DI1 and DI2 may work together to translate the functionality of interfaces I1 and I2 of FIG. 6 to a new operating system, while providing the same or similar functional result.

E. Rewriting

Figure 15:
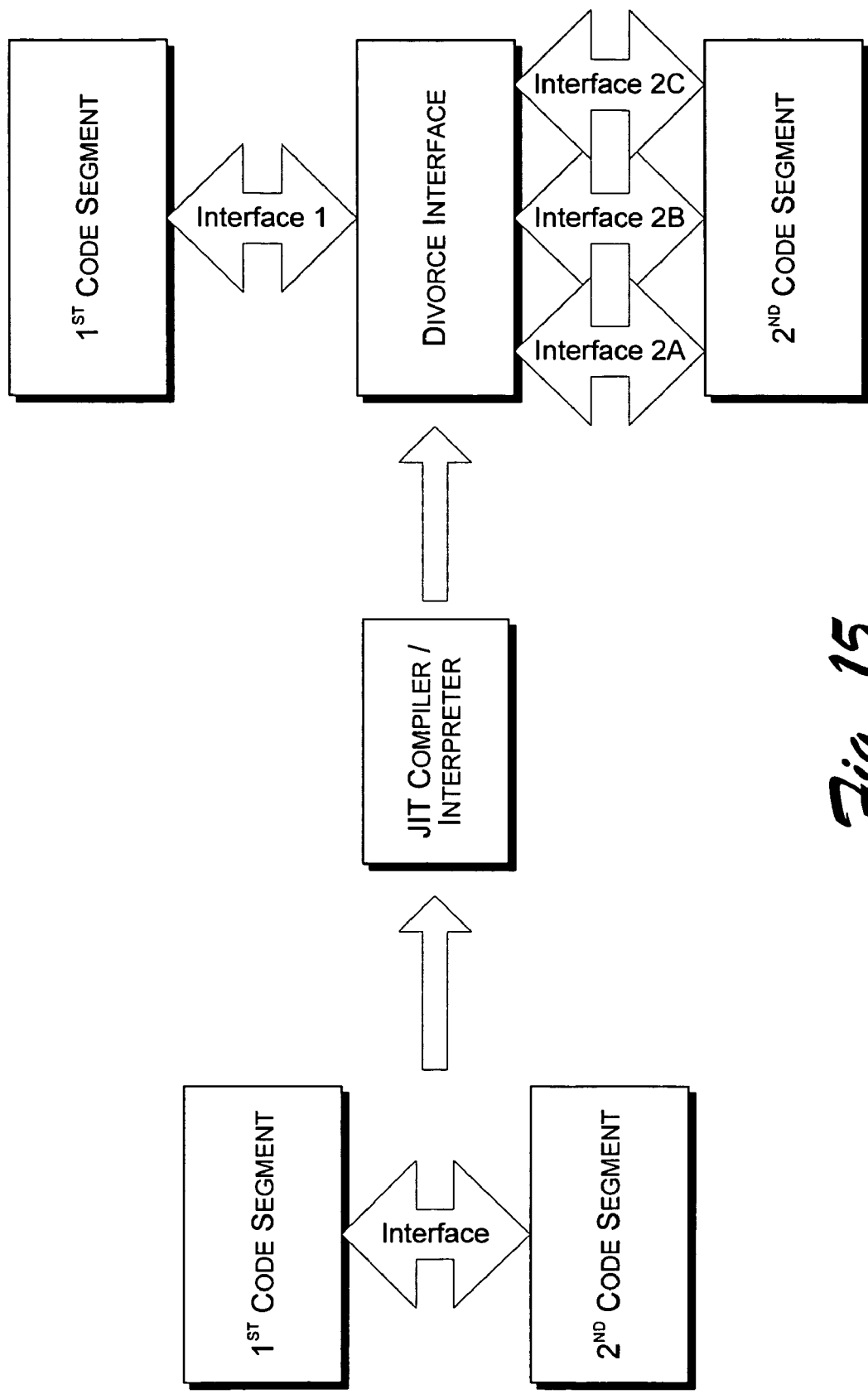
Figure 16:
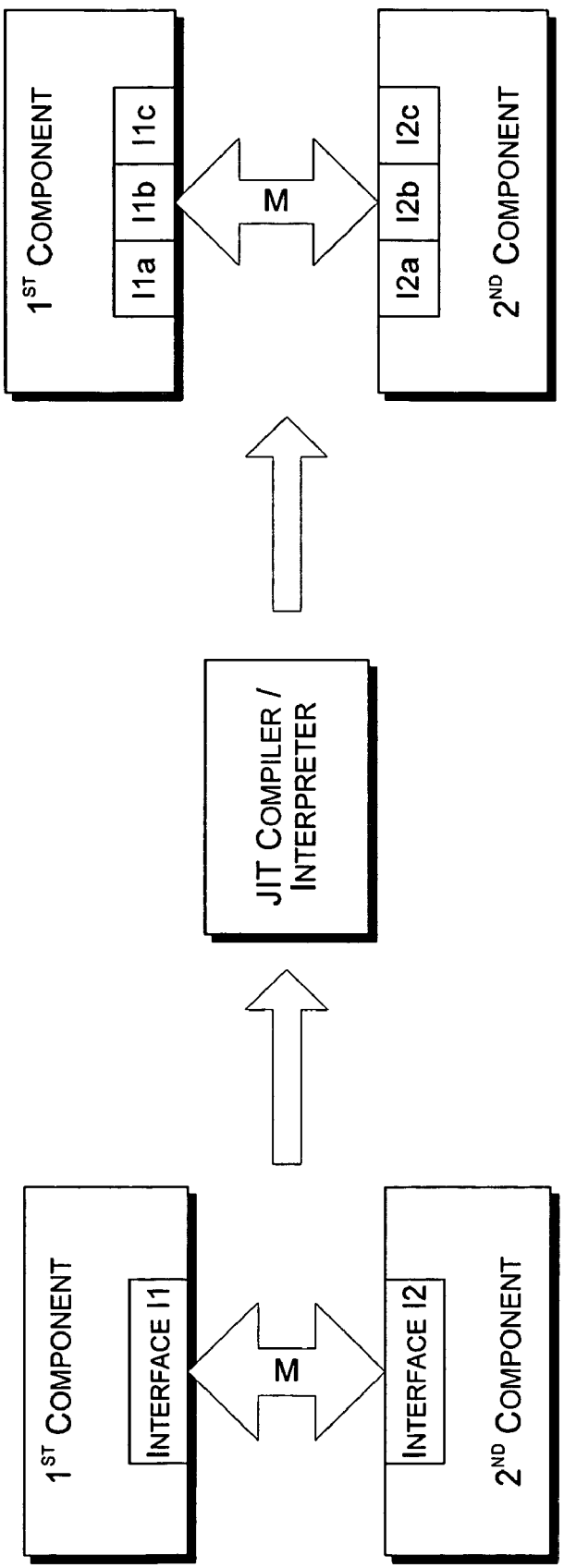

Yet another possible variant is to dynamically rewrite the code to replace the interface functionality with something else but which achieves the same overall result. For example, there may be a system in which a code segment presented in a intermediate language (e.g. Microsoft IL, Java ByteCode, etc.) is provided to a Just-in-Time (JIT) compiler or interpreter in an execution environment (such as that provided by the .Net framework, the Java runtime environment, or other similar runtime type environments). The JIT compiler may be written so as to dynamically convert the communications from the 1st Code Segment to the 2nd Code Segment, i.e., to conform them ot a different interface as may be requited the 2nd Code Segment (either the original or a different 2nd Code Segment). This is depicted in FIGS. 15 and 16. As can be seen in FIG. 15, this approach is similar to the Divorce scenario describe above. It might be done, e.g., where an installed base of applications are designed to communicate with an operating system in accordance with an Interface 1 protocol, but then operating system is changed to use a different interface. The JIT Compiler could be used to conform the communications on the fly from the installed-base applications to the new interface of the operating system. As depicted in FIG. 16, this approach of dynamically rewriting the interface(s) may be applied to dynamically factor, or otherwise alter the interface (s) as well.

It is also noted that the above-described scenarios for achieving the same or similar result as an interface via alternative embodiments may also be combined in various ways, serially and/or parallel, or with other intervening code. Thus, the alternative embodiments presented above are not mutually exclusive and may be mixed, matched and combined to produce the same or equivalent scenarios to the generic scenarios presented in FIGS. 5 and 6. It is also noted that, as with most programming constructs, there are other similar ways of achieving the same or similar functionality of an interface which may not be described herein, but nonetheless are represented by the spirit and scope of the invention, i.e., it is noted that it is at least partly the functionality representing by, and the advantageous results enabled by, an interface that underlie the value of an interface.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A computer-readable storage medium media comprising computer-executable instructions that, when executed by a processor, exposes an application program interface comprising:

a presentation namespace having a plurality of namespaces enabling presentation functionality for applications; and a media namespace as one of the plurality of namespaces, the media namespace providing a plurality of sub-namespaces and a collection of types that enable development of media presentation functionality, the plurality of sub-namespaces comprising:

a Media.Core namespace to enable media presentation functionality, the Media.Core namespace providing a collection of types which enable media presentation functionality, the collection of types comprising:

classes, the classes being selected from a group of classes comprising:

an AsfProfile to describe a configuration of a file that uses an Advanced Systems Format (ASF) file structure;

an AsfProfileMutualExclusion to describe streams that are mutually exclusive;

an AsfProfileMutualExclusionCollection to describe a collection of AsfProfileMutualExclusion Objects;

an AsfProfileSharedStreamBandwidth to describe a set of steams that, when combine, are warranted not to exceed a specified bandwidth;

an AsfProfileSharedStreamBandwidthCollection to describe a collection of AsfProfileSharedStream-Bandwidth objects;

an AttributeValuePair to represent an extensible attribute for media sample;

a BlackBoxPlaybackControl to play media for which an application cannot explicitly set a destination;

a Capabilities to provide information about media engine methods that are supported for a current media source;

a CapabilitiesChangedEventArgs to contain information about a MediaEngine;

a Capture for capturing data from an input device such as a camera or microphone;

a ContentEnabler to handle license acquisition and Media Player Individualization for digital-rights-management-protected content;

a ContentEnableEventArgs to hold information regarding an asynchronous license acquisition or individualization attempt;

a CredentialManager to handle user credentials for password-based authentication schemes such as basic, digest MTLM, and Kerberos authentication;

a Destination to represent an output of a presentation;

a DestinationCollection to provide a container for Destination Objects;

an ExternalDevice to represent external devices such as webcams, digital video (DV) cameras or VCRs;

an ExternalTransport to represent transport controls the (the physical tape transport mechanism) on an external device such as a VCR or DV camera;

a FanOutDestination for sharing the media stream with several network destinations for a broadcast presentation;

a FrameCacher;

an IndividualizationStatus to describe the status of an individualization attempt;

a LicenseData to hold data from a digitial-rights-management version 7 header that is required to obtain a license for content, and results of a license request;

a MediaBuffer to represent a block of memory that contains media data;

a MediaClip to provide high-level access to simple editing functions such as trimming a file or combining two files;

a MediaClipStream to represent a single media stream within a file;

a MediaClipStreamCollection to represent a collection of MediaClipStream objects;

a MediaEngine to provide a simple API for playing and transcoding media;

a MediaEventArgs to contain information about an event generated by an asynchronous process;

a MediaFormatConverter to convert a file from one encoding format to another;

a MediaFoundationException to contain information about an exception that has been raised in executing code specific to a media services API;

a MediaGetServiceResoltuionAttribute to create custom attributes for a class that implements a service;

a MedaSample to represent a multimedia sample for a multimedia stream type;

a MediaServerDestination to connect to a broadcast publishing point on a Windows Media server to enable push distribution;

a MediaSink to represent a device that handles final output of a media stream;

a MediaSource to represent a source of data, such as a device or file;

a MediaTransform to represent a transform which takes input data, processes it, and generates output data;

a Media TransformDesciptor to describe a media transform which has been implemented in unmanaged code as a DirectX Media Object (DMO);

a MediaTransformDescriptorCollection to represent a collection of MediaTransformDescriptor objects;

a NetListener to listen to a particular HTTP or RTSP port for client requests and forward the requests to other components;

a PresentationClock to use a presentation clock to start, stop, pause, and rate components that synchronize a multimedia presentation;

a PresentationDescriptor having information about a related set of media streams;

a PresentationTimer to represent a presentation timer;

a PropertyKeys to represent Property keys for metadata;

a PublishBroadcastMeda to stream content to connected clients through a URL;

a PublishBroadcastMediaToServer to push content to a broadcast publishing point on a Windows Media Server;

a RateControl to control playback rate;

a SampleProperties to represent core attributes of a media sample;

a Sound to represent a sound which can be played synchronously or asynchronously;

a SourceResolver to create a MediaSource from a URL or byte stream;

a StateChangedEventArgs to expose properties that an application uses to determine a state of a media engine;

a StatisticEntryUInt32 to provide access to unsigned 32-bit network statistic entry;

a StatisticEntryUInt64 to provide access to an unsigned 64-bit network statistic entry;

a StatisticUInt32Collection to represent a collection of StatisticEntryUInt32 objects;

a StatisticUInt64Collection to represent a collection of StatisticEntryUInt64 objects;

a StreamConfiguration to contain information about a configuration of a data stream;

a StreamconfigurationCollection representing a collection of stream configuration objects describing various streams in a presentation;

a StreamDescriptor having information about a single stream in a media presentation;

a StreamDescriptorCollection to represent a collection of stream descriptors describing the streams in a media source;

a StreamSink to represent a final output of a media stream;

a TimerEventArgs to contain information about a timer event;

a TranscodingEstimator to estimate time that will be required to transcode a file and a size of an output file;

a VideoControl to represent a control on a video renderer;

a VirtualRoot to enable NetListener to retrieve essential components necessary to stream content to clients; and a VolumeControl to control audio volume on a media sink or on a media engine; interfaces, delegates, enumerations, and structures;

a Media.Types namespace to describe various media types;

a Media.Animation namespace to enable animation effects; and a Media.TextFormatting namespace to enable text services.

2. A computer-readable storage medium as recited in claim 1, wherein the interfaces are selected from a group of interfaces comprising:

an IAudioMuteControl to mute a media engine;

an IAudioVolumeChannelControl to specify and retrieve a volume on individual channels of an audio rendering device;

an IAudioVolumeControl to control a volume on an audio rendering device;

an IByteSinkCallback implemented by a custom media sink;

an IContentProtectionManager to manage acquisition of licenses for digital-rights-management-protected content;

an IMangedMediaSink implemented by custom sinks; and an IMangedStreamSink implemented by custom sinks.

3. A computer-readable storage medium as recited in claim 1, wherein the enumerations are selected from a group of enumerations comprising:

an ArchiveType to specify a file type for Destination constructors that create file destinations;

an EstimatorOutputFileTypes to specify a file type for a transcoding estimator;

an HttpStatus to specify a status of an HTTP connection in an individualization attempt;

a Status property;

an InternalState to specify a current state of a media engine;

a Media Event Type to specify a type of media event that has occurred;

a MediaSinkCharacteristic to specify characteristics of a media sink;

a NetworkProtocol to specify a network protocol used by a NetListener object;

an Operation to specify which underlying unmanaged method a media engine is currently processing;

a State to specify a current state of a PublishBroadcastMedia Object;

a State to specify a current state of a PublishBroadcastMediaToServer object;

a StatusFlags to specify a status of individualization attempt;

a SuspendedState to specify why a media engine is in a suspended state;

a SystemSoundId to specify a system-defined sound for Sound.

4. A computer-readable storage medium as recited in claim 1, wherein the structures are selected from a group of structures comprising:

an ASF that contains values used as property keys for an ASP media source;

an AudioVolume to represent volume on a device or on one channel of a device;

a BandwidthProperties to contain values for a AsfProfile-SharedStreamBandwidth;

a SharedStreamBandwidthProperties property;

a CD to contain values used as a property keys for a compact disc;

a ContentProtection to contain values used as property keys for content;

a Creation to contain values used as property keys related to content creation;

a Descriptors to contain values used as property keys that describe content;

a Drm to contain values used as property keys related to digital rights management;

a File to contain values used as property keys related to content metadata;

an Identifiers to contain values used as property keys related to identifying content;

a State to provide information about a current state of a media engine;

a Text to contain values used as property keys for a compact disc; and a Urls to contains values used as property keys related to content-related URLs.

5. A computer-readable storage medium as recited in claim 1, wherein the delegates are selected from a group of delegates comprising:

a ContentEnablerEventHandler to represent AccessDenied, Individualization, LicenseAcquisition, and MonitorLicenseAquisition events for a ContentEnabler;

a CredentialRequestHandlerCallback to handle a callback function raised to obtain a user's credentials;

a GetPresentationDescriptorCallback to represent a method that retrieves a presentationDescriptor;

a MediaEventHandler to represent a delegate type for objects that handle media events;

an OnConnectionOpenCallback;

a SetDestinationCallback to represent a method that handles Destination after it is created by VirtualRoot;

a SourceEventHandler to represent a delegate type for objects that handle media source events;

a TimerEventHandler to represent a delegate type for objects that handle timer events;

a BitmapInformation to contain information about an ImageMediaType;

an HTMLFormat to contain information about an HTMLMediaType; and an SmpteTimeCode to contain information about an SMPTE (society of Motion Picture and Television Engineers) time code.

6. A computer-readable storage medium comprising computer-executable instructions that, when executed by a processor, exposes an application program interface comprising:

a presentation namespace having a plurality of namespaces enabling presentation functionality for applications; and a media namespace as one of the plurality of namespaces, the media namespace providing a plurality of sub-namespaces and a collection of types that enable development of media presentation functionality, wherein the plurality of sub-namespaces comprises:

a Media.Core namespace to enable media presentation functionality;

a Media.Types namespace to describe various media types;

a Media.Animation namespace to enable animation effects, the Media.Animation namespace providing a collection of types which enable animation effects, the collection of types comprising:

classes, the classes are selected from a group of classes comprising:

an Animatable which has properties that can be animated but does not derive from DependencyObject;

an AnimationCollection to provide base functionality for animation collection, such as ColorAnimationCollection, DoubleAnimationCollection, and SizeAnimationCollection;

an AnimationEffectOverride to implement element level animations which can participate in a rendering process to instantiate animations on multiple elements at rendering time;

an AnimationEffectCollection to hold a collection of AnimationEffects;

a BoolAnimationCollection to represent a collection of BoolModifier animations;

a BoolModifier, a BoolTimedModifier;

a BytAnimationCollection to represent a collection of BoolModifier animations;

a ByteModifier;

a ByteTimedModifier;

a CharAnimationCollection to represent a collection of CharModifier animations;

a CharModifier;

a CharTimedModifier;

a ColorAnimation to animate a color value of a property;

a ColorAnimationCollection to represent a collection of ColorModifier animations;

a ColorKeyFrameCollection;

a ColorModifier;

a ColorTimedModifier;

a DecimalAnimationCollection to represent a collection of DecimalModifier animations;

a DecimalModier;

a DecimalTimedModifier;

a DoubleAnimation to animate properties that accept a Double value;

a DoubleAnimationCollection to represent a collection of DoubleModifier animations;

a DoubleKeyFrameCollection;

a DoubleModifier;

a DoubleTimedModifier;

a FloatAnimation to animate properties that accept a Single value;

a FloatAnimationCollection to represent a collection of FloatModifier Animations;

a FloatKeyFramecollection;

a FloatModifier;

a FloatTimed Modifier;

an IntAnimationCollection to represent a collection of IntModifier animations;

an IntModifier;

an IntTimedModifier;

a LengthAnimation to animate properties that accept a Length value;

a LenghtAnimationCollection to represent a collection of LengthModifier animations;

a LegthKeyFramecollection;

a LengthModifier;

a LengthTimedModifier;

a LongAnimationCollection to represent a collection of LongModifier animations;

a LongModifier;

a LongTimedModifier;

a MatrixAnimationCollection to represent a collection of MatrixModifier animations;

a MatrixModifier;

a MatrixTimedModifier;

a Modifier;

an ObjectAnimationCollection to represent a collection of ObjectModifier animations;

an ObjectModifier;

an ObjectTimedModifier;

a PathAnimation for use inside of a MatrixAnimationCollection to move a visual object along a path;

a PointAnimation to animate properties that accept Point Values;

a PointAnimationCollection to represent a collection of PointModifier animations;

a PointKeyFrameCollection;

a PointModifier;

a PointTimedModifier;

a RectAnimation to animate properties that accept a Rect value;

a RectAnimationCollection to represent a collection of RectModifier animations;

a RectKeyFrameCollection;

a RectModifier;

a RectTimedModifier;

a ShortAnimationCollection to represent a collection of ShortModifier animations;

a ShortModifier;

a ShortTimedModifier;

a SizeAnimation to define an animation based on the Size of an object;

a SizeAnimationCollection to represent a collection of SizeModifier animations;

a SizeKeyFrameCollection;

a SizeModifier;

a SizeTimedModifier;

a StringAnimationCollection to represent a collection of StringModifier animations;

a StringModifier;

a StringTimedModifier;

a Timeline to maintain run-time timing state for timed objects;

a TimelineBuilder to create Timeline objects;

a TimeManager to control an entire timing tree;

a TimeSyncValueTypeConverter to perform type conversions involving TimeSyncValue values;

a TimeTypeConverter to perform type conversions involving Time values;

a VectorAnimation to animate properties that accept a Vector value;

a VectorAnimationCollection to represent a collection of VectorModifier animations;

a VectorKeyFrameCollection;

a VectorModifier; and a VectorTimedModifier;

interfaces;

delegates;

enumerations; and structures; and a Media.TextFormatting namespace to enable text services.

7. A computer-readable storage medium as recited in claim 6, wherein the interfaces are selected from a group of interfaces comprising:

an IClock to represent an object that can provide linear time values;

an IModifier to define behavior of a modifier object;

an ITimingControl to define behavior of timelines and times objects; and an ITimingControlBuilder to represent an object that can build a timeline template.

8. A computer-readable storage medium as recited in claim 6, wherein the enumerations are selected from a group of enumerations comprising:
- an AnimationType to describe behavior of an animation;
- a CloneType representing types of clones that CloneCore may request;
- an InterpolationMethod to describe how an animation calculates output values;
- a KeyTimeType representing different types of KeyTimes;
- a TimeEndSync representing values for an endSync attribute, which specifies how a container calculates its duration based on children's durations;
- a TimeFill to specify how a timeline behaves after it is no longer active;
- a TimeRestart representing values for a Timeline;
- a TimeSeekOrigian to indicate a timeline position; and
- a TimeSyncBase representing an event to synchronize a begin or end value to.

9. A computer-readable storage medium as recited in claim 6, wherein the structures are selected from a group of structures comprising:
- a ColorKeyFrame;
- a DoubleKeyFrame;
- a FloatKeyFrame;
- a KeySpline to pass an array of key splines into a KeySplines property of an animation fragment;
- a KeyTime to specify when relative to a time of an animation that a KeyFrame takes place;
- a LengthKeyFrame;
- a PointKeyFrame;
- a RectKeyFrame;
- a SizeKeyFrame;
- a Time representing time, with associated time arithmetic operations;
- a TimelineEnumerator to enumerates items in an TimelineList Collection;
- a TimeSyncValue representing an absolute or relative begin or end time for a timeline; and
- a VectorKeyFrame.

10. A computer-readable storage medium comprising computer-executable instructions that, when executed by a processor, exposes an application program interface comprising:
- a presentation namespace having a plurality of namespaces enabling presentation functionality for applications; and
- a media namespace as one of the plurality of namespaces, the media namespace providing a plurality of sub-namespaces and a collection of types that enable development of media presentation functionality, the plurality of sub-namespaces comprising:
- a Media.Core namespace to enable media presentation functionality;
- a Media.Types namespace to describe various media types;
- a Media.Animation namespace to enable animation effects; and
- a Media.TextFormatting namespace to enable text services, the Media.TextFormatting namespace providing a collection of types to enable text services, the collection of types comprising:
- classes, the classes being selected from a group of classes comprising:
    - an InlineObjectInfo to provide measurement details for inline text objects;
    - a TextFormatter to provide services for formatting text and breaking text lines;
    - a TextHighlightBounds to bound a text range;
    - a TextInfo to represent information about a block of text in a client's text source character store;
    - a TextLine to provide services to a line of text;
    - a TextMarkerGeneratedContent to generate line list marker output;
    - a TextMarkerInfo to define a style and type of a paragraph's list marker;
    - a TextParagraphProperties to represent properties that can change from one paragraph to a next paragraph, such as flow direction, alignment, or indentation;
    - a TexRun to define a sequence of characters that share a single property set;
    - a TextRunBounds to bound a text run;
    - a TextRunCache to provide caching services to a TextFormatter object in order to improve performance;
    - a TextRunClientData to represent client information data associated with a TextRun;
    - a TextRunProperties to provide properties that can change form one TextRun to another, such as typeface or foreground brush;
    - a TextRunTypographyProperties to provide typography properties for TextRun;
    - a TextSource to provide character data and formatting properties to a TextFormatter; and
    - a TextTrimmingInfo to provide description of text trimming characteristics;
- interfaces;
- delegates;
- enumerations; and
- structures.

11. A computer-readable storage medium as recited in claim 10, wherein the enumerations are selected from a group of enumerations comprising:
- a TextParagraphFlags to flag describing paragraph characteristics;
- a TextRunCacheFlags to represent content in text run cache; and
- a TextRunType to indicate a type of TextRun.

12. A computer-readable storage medium as recited in claim 10, wherein the structures are selected from a group of structures comprising:
- a TestSourceCharacterIndex to represent a caret or character position in text.

13. A computer-readable storage medium comprising computer-executable instructions that, when executed by a processor, exposes an application program interface comprising:
- a presentation namespace having a plurality of namespaces enabling presentation functionality for applications; and
- a media namespace as one of the plurality of namespaces, the media namespace providing a plurality of sub-namespaces and a collection of types that enable development of media presentation functionality, the collection of types from the media namespace comprises:
- classes, the classes are selected from a group of classes comprising:
    - an ArcSegment representing an elliptical arc between two points;
    - an AudioData enabling playing of audio files according to the state of a time node;
    - an AudioDataConverter representing an audio data converter;
    - a BezierSegment representing a cubic Bézier curve drawn between two points;

a Brush providing a generic means for filling an area using solid colors (SolidColorBrush), gradients (LinearGradientBrush, RadialGradientBrush), images (ImageBrush), and video;
a BrushConverter to convert a Brush object to or from another object type;
a Brushes to implement a set of predefined solid colors;
a CloseSegment representing a line that connects the last point of a PathFigure object with its starting point;
a CodecFilter for enumerating codecs;
CodecInfo representing information about a specific codec and a factory for creating the specific codec;
a ColorCollection;
a ColorCollectionConverter for converting instances of other types to and from ColorCollection instances;
a ColorContext;
a ColorConverter to convert a color object to or from another object types;
a Colors to implement a set of predefined colors;
a ContainerVisual to manage a collection of visual objects;
a DashArrays to contain properties for well known dash styles;
a DoubleCollection;
a DoubleCollectionConverter for converting instances of other types to and from DoubleCollection instances;
a Drawing representing a list of 2-dimensional drawing primitives;
a DrawingBrush to define its content as a Drawing;
a DrawingContext representing a Drawing context;
a DrawingVisual to contain graphical content to be drawn;
an Ellipse Geometry representing the geometry of a circle or ellipse;
a FontFamily representing a Font family;
a FormattedText for adding text to a MIL visual;
a Geometry providing base functionality for all geometry classes;
a GeometryCollection representing a collection of Geometry objects;
a GetPageEventArgs;
a GlyphRun;
a GlyphTypeface representing a physical font face corresponding to a font file on a disk;
a GradientBrush describing a gradient fill;
a GradientStop describing a location and color of a transition point in a gradient;
a GradientStopCollection representing a collection of GradientStop gradient stops;
a HitTestParameters to pack together parameters for a hit test pass;
a HitTestResult to return a visual that was hit during a hit test pass;
a HwndInterop;
a HwndVisual;
a HyphenationCandidate describing a hyphenation candidate;
an ICCProfile;
an ImageBrush to fill an area with an image;
an ImageCodecCollection representing a collection of codecs on a system;
an ImageCodecEnumerator representing an enumerator for Image frames;
an ImageColorTransform to perform color management on an imaging pipeline;
an ImageData containing an image and related data;
an ImageDataBuilder to build and ImageData object;
an ImageDecoder to contain image frames;
an ImageDecoderBmp to provide bitmap decoding;
an ImageDecoderGif to provide GIF decoding;
an ImageDecoderIcon to provide Icon decoding;
an ImageDecoderInternal for internal use only;
an ImageDecoderJpeg to provide Jpeg decoding;
an ImageDecoderPng to provide PNG decoding;
an ImageDecoderTiff to provide Tiff decoding;
an ImageEffect to provide imaging effects;
an ImageEffectBlur to provide a Gaussian blur effect;
an ImageEffectFlipRotate to flip an image in X or Y and rotate by multiples of 90 degrees;
an ImageEffectGammaCorrect to change the gamma of an image;
an ImageEffectGlow to perform a glow effect;
an ImageEffectGrayscale to convert an image to grayscale;
an ImageEffectNegate to negate an image;
an ImageEffectSource;
an ImageEffectSourceCollection to provide a collection of image effect outputs;
an ImageEffectTint to provide a tint output effect;
an ImageEncoder to collect a set of frames with their associated thumbnails and metadata and save them to a specified stream;
an ImageEncoderBmp to provide an encoder for Bmp-files;
an ImageEncoderGif to provide an encoder for Gif files;
an ImageEncoderInternal to collect a set of frames with their associated thumbnail and metadata and saves them to a specified stream;
an ImageEncoderJpeg to provide an encoder for Jpeg files;
an ImageEncoderPng to provide an encoder for Png files;
an ImageEncoderTiff to provide an encoder for Tiff files;
an ImageExchangeMetaData to access and set metadata for ImageFiles which have Exif style metadata;
an Image ExchangeProperty representing a tuple of an ImageExehangeID and object which is the value of that property;
an ImageMetaData to access and set metadata for Images;
an ImagePalette;
an ImageSizeOptions to size options for an image;
an ImageSource to define methods, properties, and events for an imaging pipeline, including decoders and effects;
an ImageSourceCollection representing a collection of codecs on a system;
an ImageSourceConverter;
an IntegerCollection;
an IntegerCollectionConverter for converting instances of other types to and from IntegerCollection instances;
a LinearGradientBrush to define a linear gradient used to fill and area;
a LineGeometry representing a geometry of a line;
a LineSegment representing a line between two points;
a MatrixTransform to create an arbitrary affine matrix transformation used to manipulate objects or coordinate systems in a two-dimensional plane;
a MedaData to playback Audio/Video content;
a MedaSystem to control a media layer;
a NineGridBrush to fill an entire area with an image;

a PathFigure representing a sub-section of a geometry, a single connected series of two-dimensional geometric segments;
a PathFigureCollection;
PathFigureConverter;
a PathGeometry representing a complex shape that may be composed of arcs, curves ellipses, lines, and rectangles;
a PathGeometryConverter;
a PathSegment that represents a segment of a PathFigure object;
a PathSegmentCollection that represents a list of PathSegment objects;
a PathSegmentConverter;
a Pen to describe how a shape is outlined;
a PixelFormats representing a collection of supported Pixel Formats;
a PointCollection;
a PointCollectionConverter for converting instances of other types to and from PointCollection instances;
a PointHitTestParameters for specifying parameters hit testing with a point;
a PointHitTestResult to return a point and visual hit during a hit test pass;
a PolyBezierSegment;
a PlyLineSegment PolyLineSegment;
a PolyQuadraticBezierSegment;
a PrintContext PrintContext to hold a state and context for a printer interation;
a QuadraticBezierSegment;
a RadialGradientBrush to define a radial gradient used to fill an object;
a RectangleGeometry representing a geometry of a rectangle;
a RetainedVisual;
a RotateTransform to rotate an object about a specified point in a two-dimensional x-y plane;
a ScaleTransform to scale an object in a two-dimensional x-y plane, starting from a defined center point;
a SkewTransform representing a two-dimensional skew;
a SolidColorBrush representing a solid, uniform fill;
a StartSegment;
a SubLineCollection;
a TileBrush that describes a way to fill a region with one or more tiles;
a Transform used as a parent class of all types of transformations in a two-dimensional place, including rotation (RotateTransform), scal (ScaleTransform), skew (SkewTransform), and translation (TranslateTransform);
a TransformCollection to create and manipulate a list of Transform objects;
a TransformConverter to convert a Transform object to or from another object type;
a TranslateTransform to translate an object in a two-dimensional x-y place;
a Typeface representing a combination of family, weight, style and stretch:
a VectorCollection;
a VectorCollectionConverter for converting instances of other types to and from VectorCollection instances;
a VideoData for playing of video files according to a state of a time node;
a VideoDataConverter;
a Visual Base class for providing services and properties common to all Visual, including hit-testing, coordinate transformation, and bounding box calculations;
a VisualCollection representing a collection of Visual objects; and
a Visual Manager to render a tree of Visual objects to a rendering target;
interfaces;
delegates;
enumerations; and
structures.

14. A computer-readable storage medium as recited in claim 13, wherein the interfaces are selected from a group of interfaces comprising:
an Ihyphenate representing an interface for a Hyphenation Service Provider;
an IretainedRender; and
an Ivisual to define common methods and services available from a visual object.

15. A computer-readable storage medium as recited in claim 13, wherein the delegates are selected from a group of delegates comprising:
a GetPageEventHandler;
a HitTestFilterDelegate to control whether to test against children of visual; and
a HitTestResultDelegate to control returning of a hit information on visual.

16. A computer-readable storage medium as recited in claim 13, wherein the enumerations are selected from a group of enumerations comprising:
a BrushMappingMode to describe whether certain values should be considered as absolute local coordinates or whether they should be considered multiples of a bounding box's size;
a ChannelDescription to describe order of each channel of pixel data;
a ColorInterpolationMode to determine how colors in a gradient are interpolated;
a Combinemode to specifie a method used to combine two geometric areas;
a FillRule;
a GradientSpreadMethod to specify how a gradient should be drawn outside of a specified gradient vector or space;
a HitTestFilterBehavior for filtering visual while hit testing;
a HitTestResultBehavior to control behavior when a positive hit occurs during hit testing;
a HorizontalAlightment to describe how content is positioned horizontally within a container;
a HyphenationRule representing supported hyphenation rules;
an ImagePaletteType representing pre-defined palette types;
a MediaState to hold a current state of media;
a PenDashCap to describe drawing of ends of a dash within a dashed line;
a PenLineCap to describe a shape at an end of a line or segment;
a PenLineJoin to describe drawing corners of the line;
a Rotation representing rotation to be applied in multiples of 90 degrees;
a StandardColorSpace;
a Stretch to describe how a source rect should be stretched to fit a destination rect;
a StyleSimulations representing a font style simulation;
a TiffCompressOptions representing compress options for saving TIFF images;
a Tile Mode to describe drawing ends of a line; and a VerticalAlignment to describe how content is positioned vertically within a container.

17. A computer-readable storage medium as recited in claim 13, wherein the structures are selected from a group of structures comprising:
- a CharacterIndexer to implement named indexers for characters;
- a Color to represent colors in terms of alpha, red, green, and blue channels;
- a GlyphIndexer to implement named indexers for glyph metrics;
- an ImageExhangeID representing a key for a property in an ImageMetaData instance;
- an ImageExchangeMetaDataEnumerator to contain an IEnumerator interface;
- an ImageFramEnumerator for Image frames;
- an ImageMetaDataRational to represent a signed numerator and a signed denominator;
- an ImagePaletteColor;
- an IntegerRect to specify a source rect of interest from an image;
- a Matrix representing a 3×3 matrix used for transformations in two-dimensional space;
- a NamedStringIndexer to implement named indexers for strings localized in multiple cultures; and
- a PixelFormat providing a pixel format definition for images and pixel-based surfaces.

* * * * *